United States Patent
Fujita et al.

(10) Patent No.: US 9,276,489 B2
(45) Date of Patent: Mar. 1, 2016

(54) POWER CONVERTER HAVING CLAMP CIRCUIT WITH CAPACITOR AND COMPONENT FOR LIMITING CURRENT FLOWING INTO CAPACITOR

(75) Inventors: Takayuki Fujita, Kusatsu (JP); Kenichi Sakakibara, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 465 days.

(21) Appl. No.: 13/322,382

(22) PCT Filed: Jun. 3, 2010

(86) PCT No.: PCT/JP2010/059423
§ 371 (c)(1),
(2), (4) Date: Nov. 23, 2011

(87) PCT Pub. No.: WO2010/140650
PCT Pub. Date: Dec. 9, 2010

(65) Prior Publication Data
US 2012/0063178 A1  Mar. 15, 2012

(30) Foreign Application Priority Data
Jun. 4, 2009  (JP) .................................. 2009-135387

(51) Int. Cl.
*H02M 5/458* (2006.01)
*H02M 1/15* (2006.01)
*H02M 1/34* (2007.01)

(52) U.S. Cl.
CPC .............. *H02M 5/4585* (2013.01); *H02M 1/15* (2013.01); *H02M 1/34* (2013.01)

(58) Field of Classification Search
CPC ...... H02M 5/44; H02M 5/458; H02M 5/4585
USPC ............................................. 363/34, 37, 127
See application file for complete search history.

(56) References Cited

U.S. PATENT DOCUMENTS 4,331,994 A * 5/1982 Wirth ..................... H02H 3/445
361/100
5,465,202 A * 11/1995 Ibori ...................... H02H 3/247
363/34

(Continued)

FOREIGN PATENT DOCUMENTS

JP  5-56682 A  3/1993
JP  6-209574 A  7/1994

(Continued)

OTHER PUBLICATIONS

Itoh et al., "Decoupling Control of Input and Output Reactive Power of the Matrix Converter," IEEJ Technical Meeting on Semiconductor Power Converter, 2001, pp. 47-52 (including partial English translation of related portion).

(Continued)

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A converter includes switching devices connected between each of a plurality of input ends and a DC power supply line, and switching devices connected between each of the plurality of input ends and a DC power supply line. A capacitor, a resistor and a diode are connected in series with each other between the DC power supply lines.

18 Claims, 24 Drawing Sheets

(56) References Cited

U.S. PATENT DOCUMENTS

| | | | |
|---|---|---|---|
| 6,330,170 B1 * | 12/2001 | Wang et al. | 363/37 |
| 7,250,794 B2 * | 7/2007 | Franke | H02M 5/458 |
| | | | 318/400.3 |
| 7,573,732 B2 * | 8/2009 | Teichmann | H02M 1/32 |
| | | | 363/37 |
| 7,633,249 B2 | 12/2009 | Sekimoto et al. | |
| 7,944,717 B2 | 5/2011 | Sakakibara | |
| 2004/0179379 A1 * | 9/2004 | Nuutinen | H02H 7/125 |
| | | | 363/37 |
| 2007/0030707 A1 * | 2/2007 | Wei et al. | 363/44 |
| 2007/0246943 A1 * | 10/2007 | Chang et al. | 290/44 |
| 2008/0094864 A1 * | 4/2008 | Sekimoto et al. | 363/36 |
| 2008/0211449 A1 * | 9/2008 | Yamai et al. | 318/767 |
| 2009/0086515 A1 | 4/2009 | Sakakibara | |
| 2010/0246217 A1 | 9/2010 | Sakakibara | |
| 2011/0007531 A1 | 1/2011 | Sakakibara | |
| 2013/0114311 A1 * | 5/2013 | Alexander | H02M 5/275 |
| | | | 363/37 |

FOREIGN PATENT DOCUMENTS

| | | | |
|---|---|---|---|
| JP | 2524771 B2 | 8/1996 | |
| JP | 9-98576 A | 4/1997 | |
| JP | 2005-6401 A | 1/2005 | |
| JP | 2006-81261 A | 3/2006 | |
| JP | 2006-94682 A | 4/2006 | |
| JP | 3772898 B2 | 5/2006 | |
| JP | 3806872 B2 | 8/2006 | |
| JP | 2007-312589 A | 11/2007 | |
| JP | 4049189 B2 | 2/2008 | |
| JP | 2008-67490 A | 3/2008 | |
| JP | 2009-77616 A | 4/2009 | |
| JP | 2009-95149 A | 4/2009 | |
| KR | 10-2007-0043893 A | 4/2007 | |
| WO | WO 2007/123118 A1 | 11/2007 | |

OTHER PUBLICATIONS

Kato et al., "Improvement of Waveform for a Boost type AC/DC/AC Direct Converter Focused on Input Current," IEEJ Industry Applied Section Meeting 1-31, 2007, pp. 279-282 (including a partial English translation of p. 280).

Kato et al., "Improvement of Waveform for a Boost type AC/DC/AC Direct Converter," IEEJ National Convention 4-098, 2007, pp. 153 and 154 (including a partial English translation of pp. 153-154).

Kim et al., "AC/AC Power Conversion Based on Matrix Converter Topology with Unidirectional Switches," IEEE Transactions on Industry Applications, vol. 36, No. 1, Jan./Feb. 2000, pp. 139-145.

Takeshita et al., "PWM Scheme for Current Source Three-Phase Inverters and Converters," IEEJ Transactions on Industry Applications, vol. 116-D, No. 1, 1996, pp. 106 and 107 (including a partial English translation of an extract of the relevant portion).

Wei et al., "A Novel Matrix Converter Topology With Simple Commutation," IEEE IAS 2001, vol. 3, 2001, pp. 1749-1754 (6 pages).

Klumpner et al., "Active Compensation of Unbalanced Supply Voltages for Two-Stage Direct Power Converters Using the Clamp Capacitor", IEEE 36th Conference on Power Electronics Specialists, 2005, pp. 2376-2382, date of conference: Jun. 16, 2005.

* cited by examiner

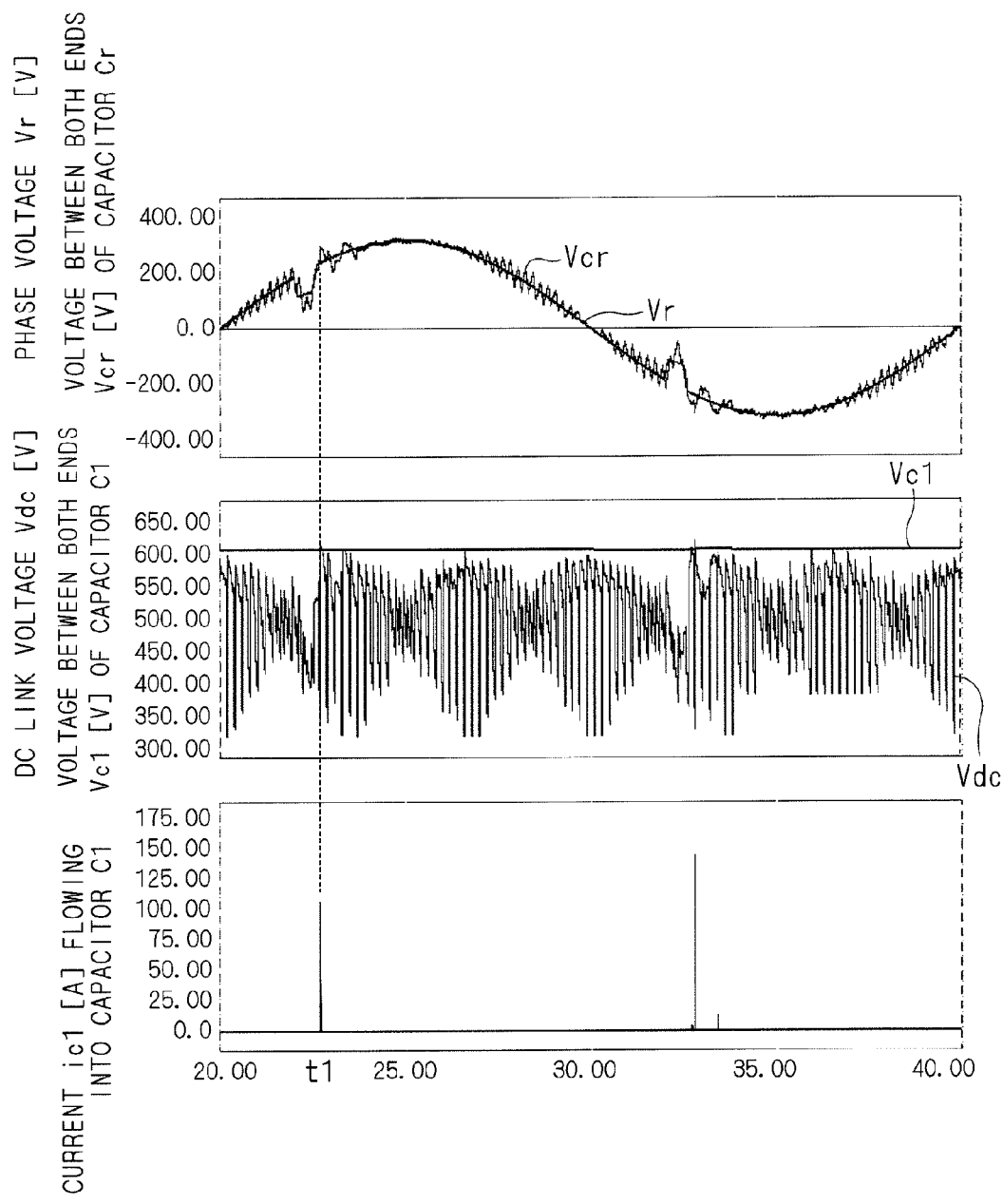
F I G . 5

F I G. 6
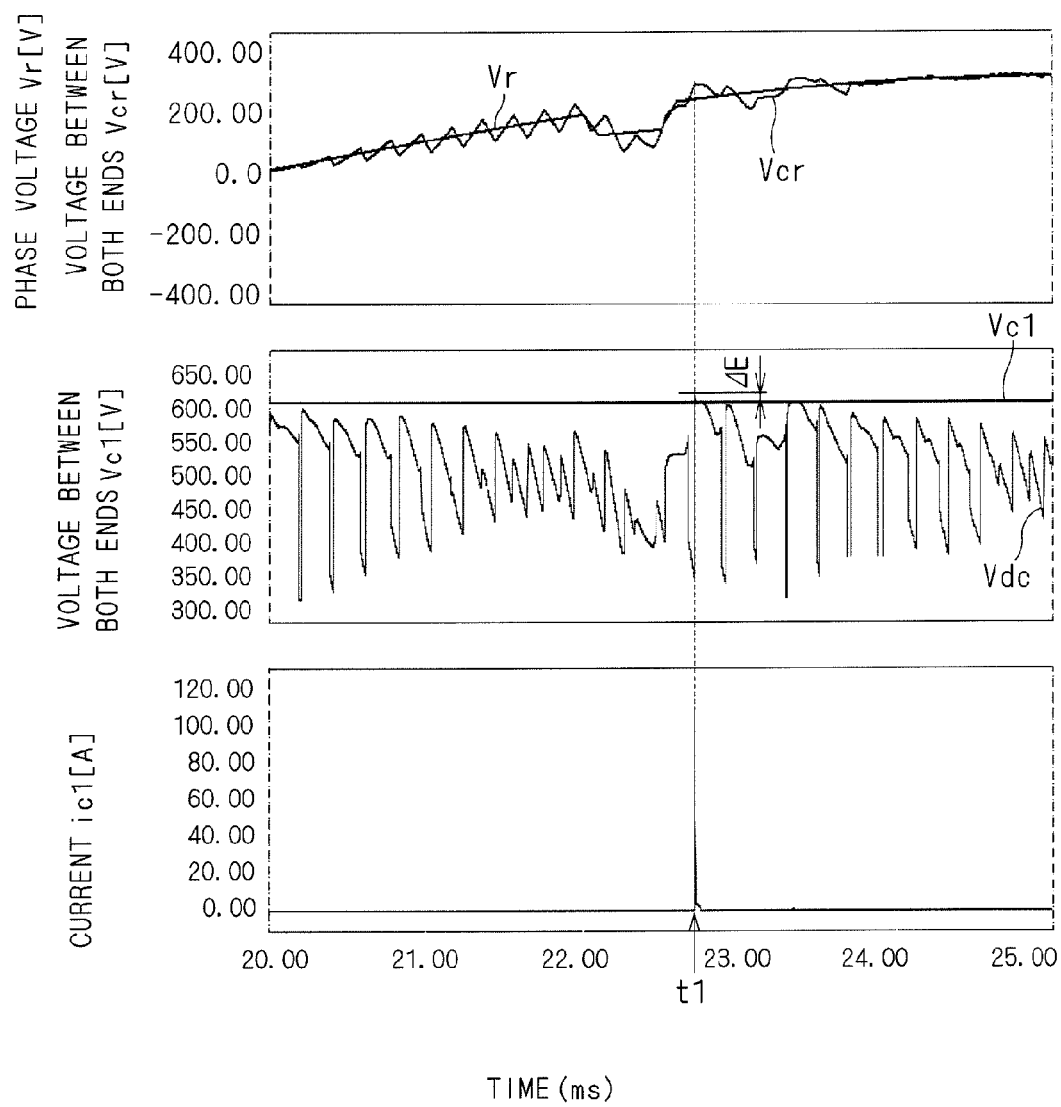

F I G. 8
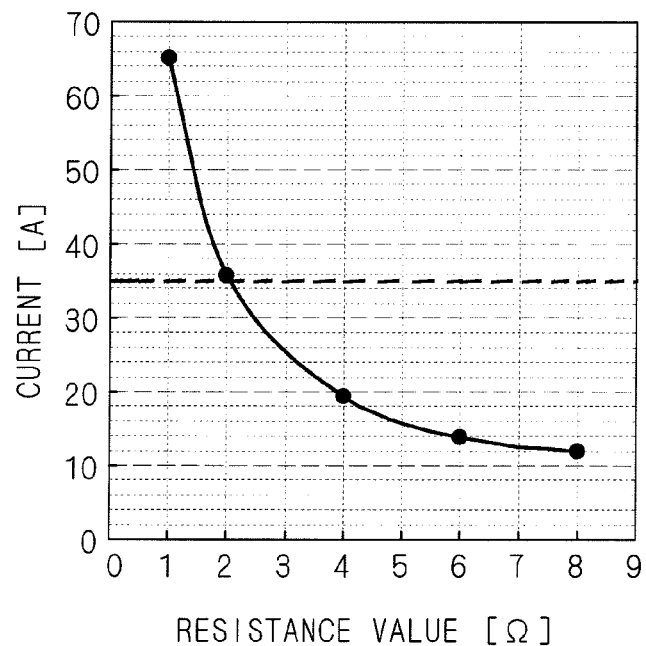
F I G. 9
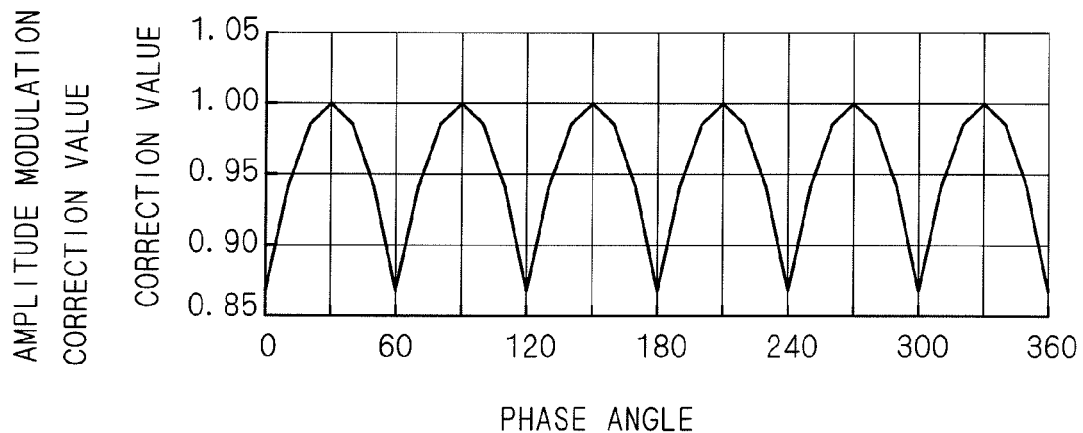

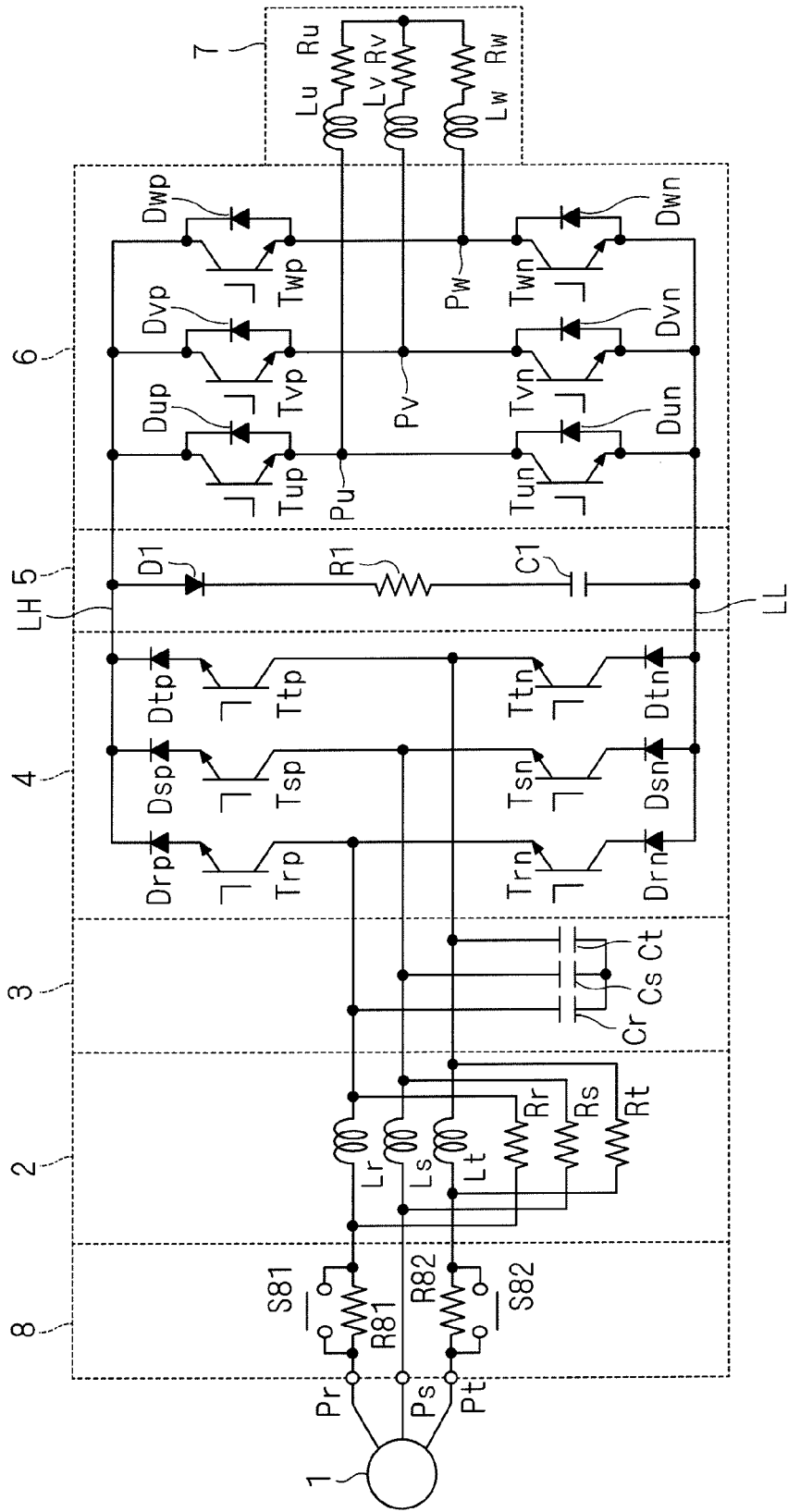
F I G . 1 4

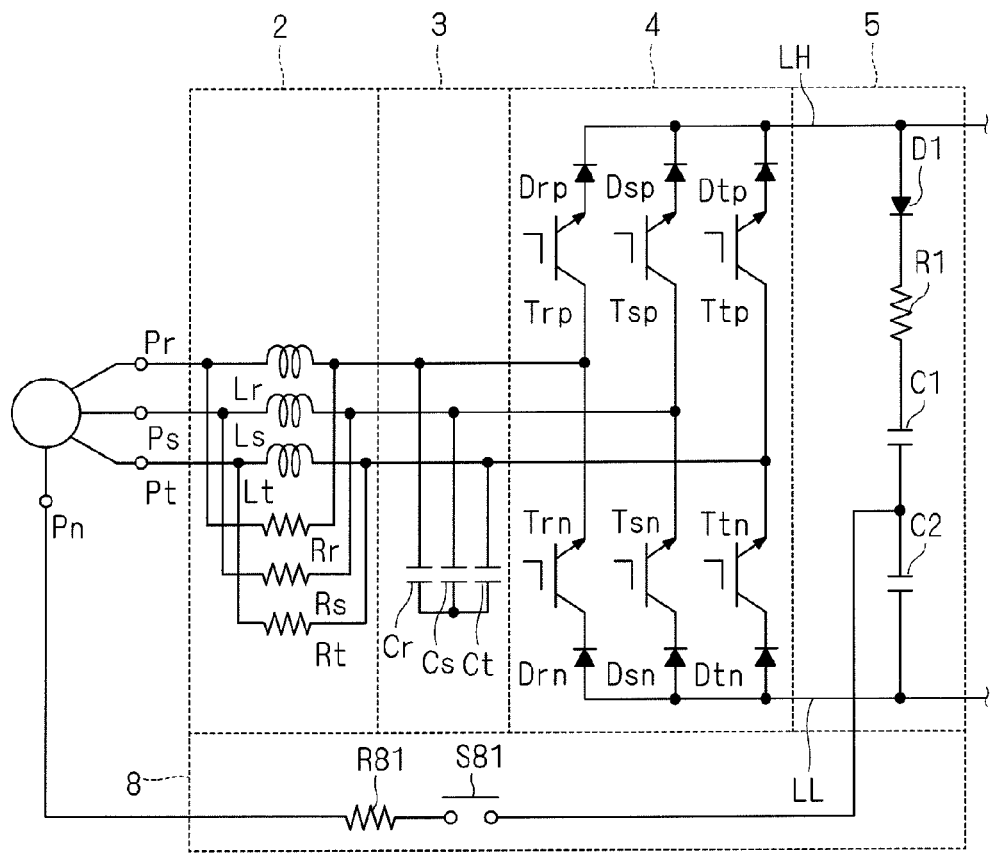
F I G . 1 5

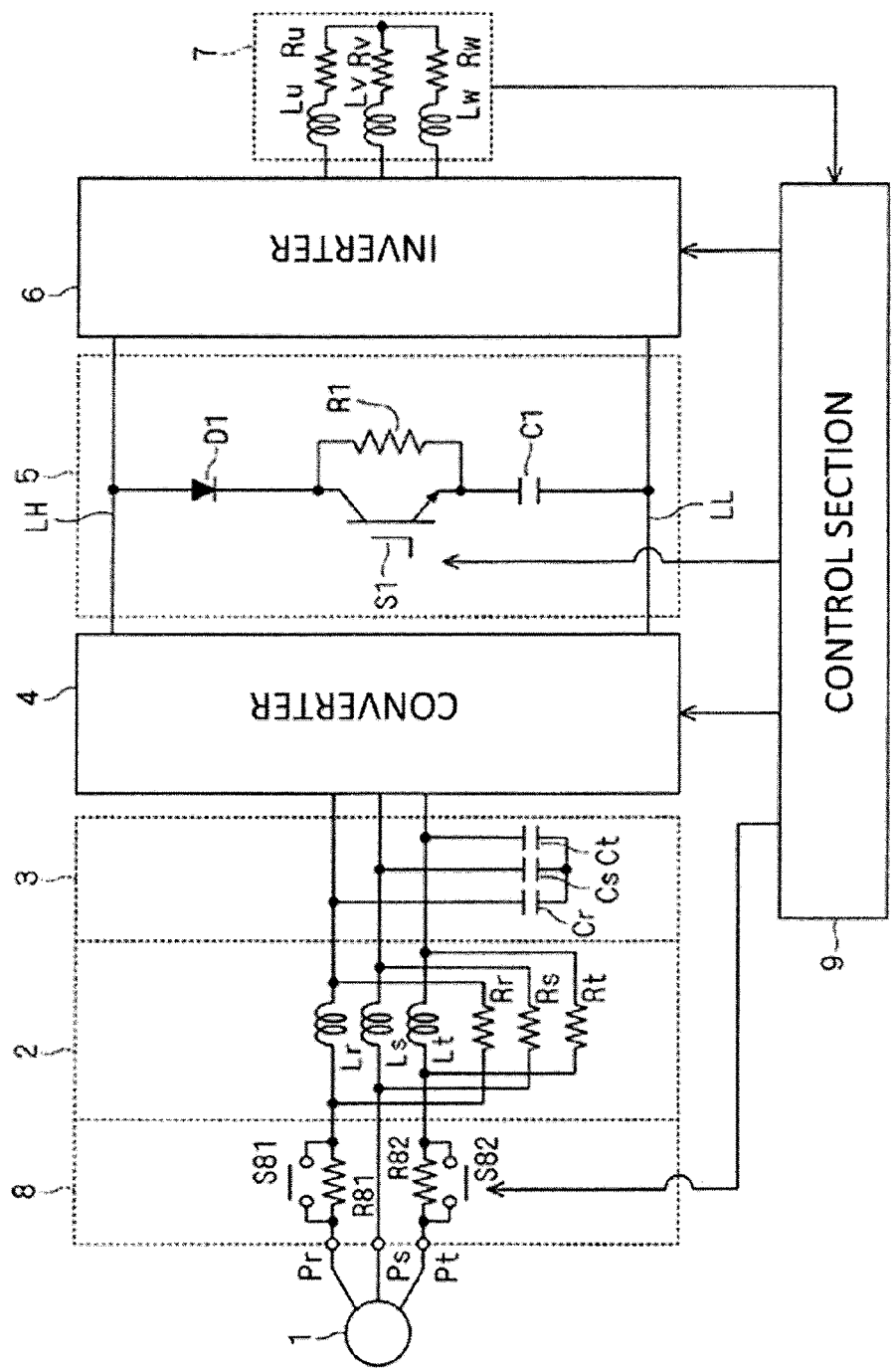
F I G . 1 6

F I G . 1 7
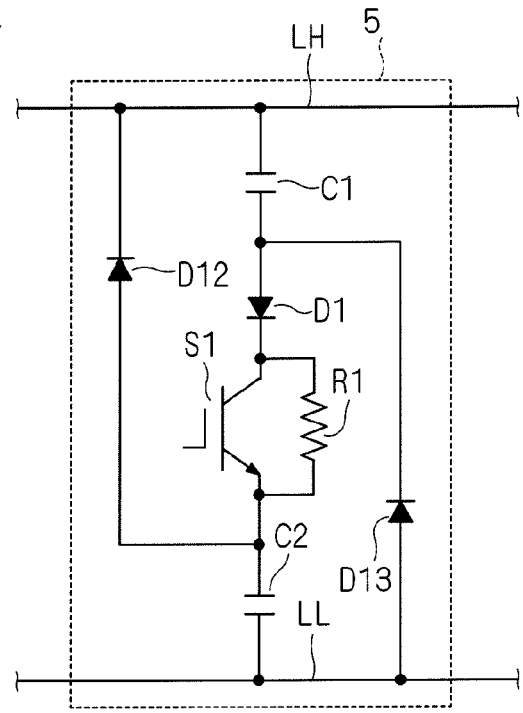
F I G . 1 8
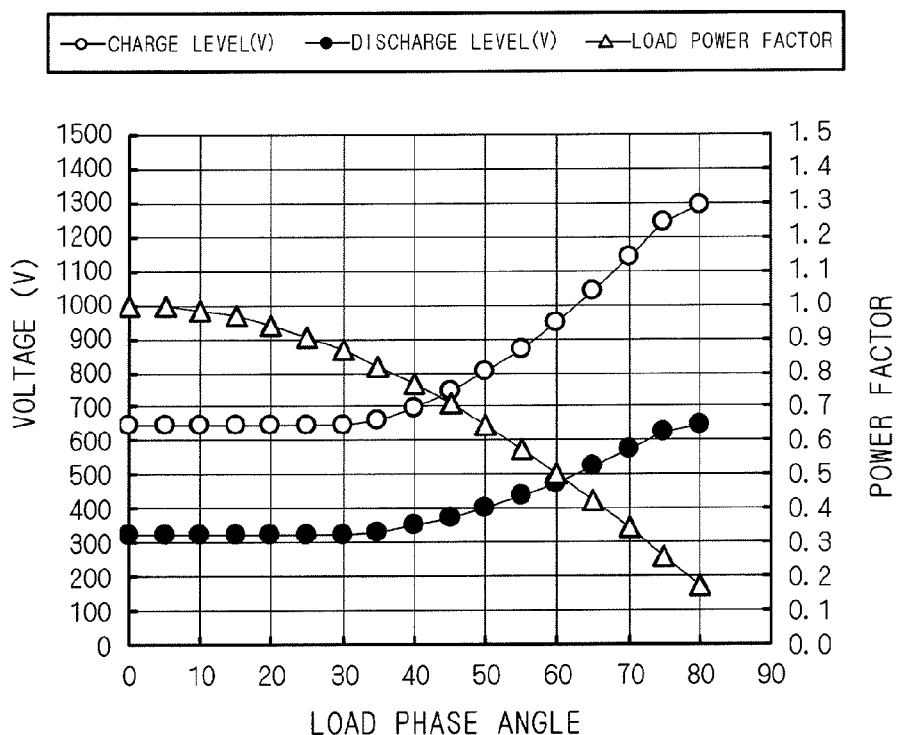

F I G. 2 1
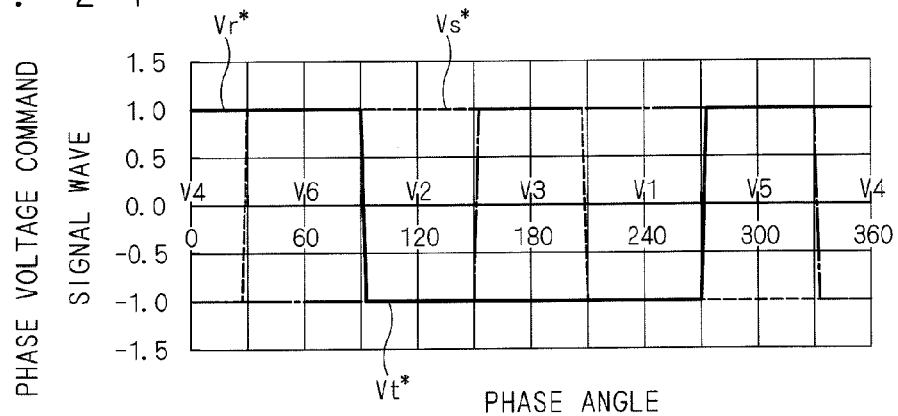
F I G. 2 2
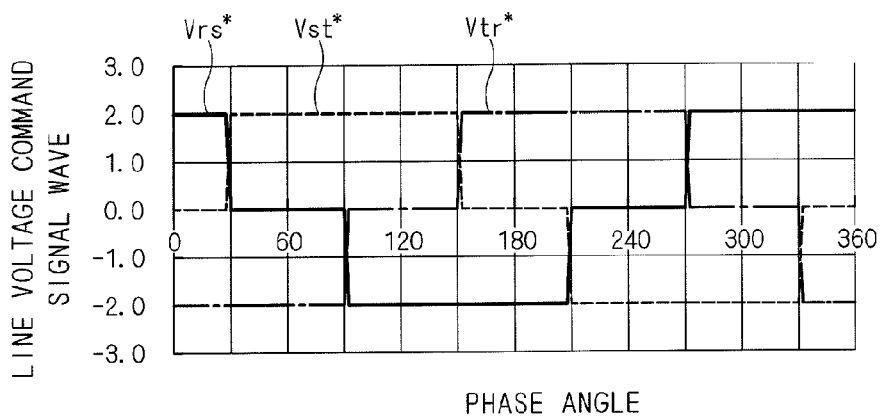
F I G. 2 3
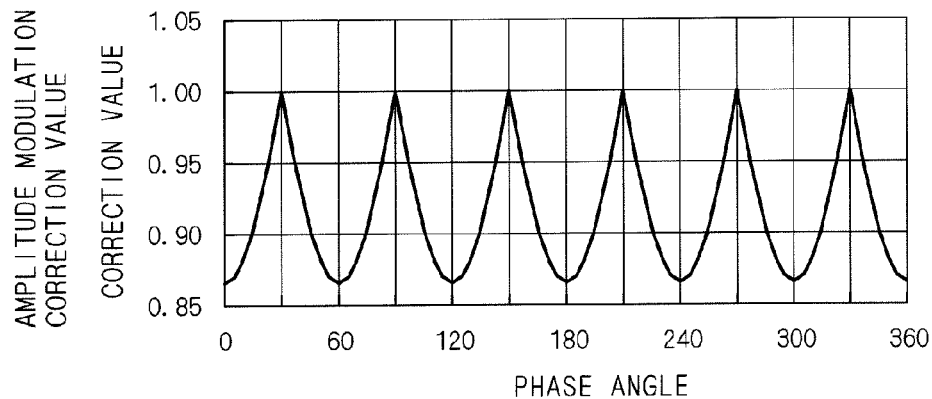

F I G . 2 9
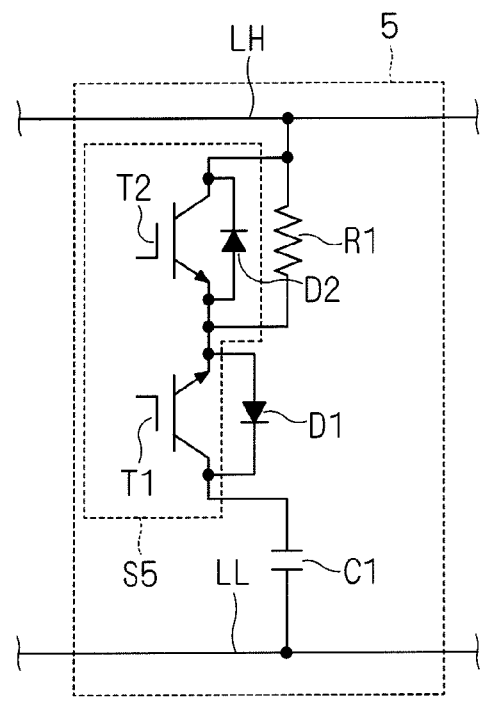
F I G . 3 0
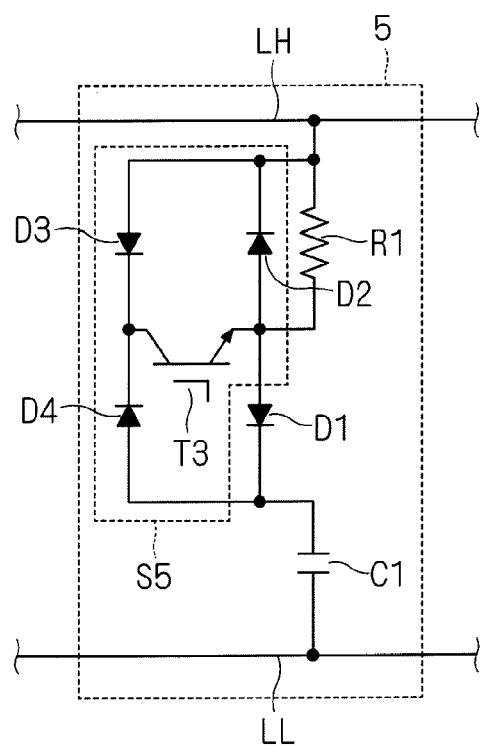

POWER CONVERTER HAVING CLAMP CIRCUIT WITH CAPACITOR AND COMPONENT FOR LIMITING CURRENT FLOWING INTO CAPACITOR

TECHNICAL FIELD

The present invention relates to a power converter, and more particularly, to a power converter including a clamp circuit (including a snubber) on an output side of a converter.

BACKGROUND ART

A so-called indirect AC power converting circuit is generally used as the typical main circuitry of an inverter. In the indirect AC power converting circuit, AC is rectified and is converted into DC via a smoothing circuit, whereby an AC output is obtained by a voltage-source converter.

Meanwhile, as a mode of directly obtaining an AC output from an AC voltage, there is known a direct AC power converter represented by a matrix converter. The direct AC power converter does not require a large capacitor for smoothing a voltage ripple due to commercial frequency or a reactor, and thus a converter is expected to be miniaturized. Accordingly, in recent year, a direct AC power converter has been drawing attention as the next generation of a power converter.

For example, Japanese Patent Application Laid-Open No. 2007-312589 and WO 2007/123118 disclose that AC is directly converted into AC without providing a smoothing circuit in a DC link. Further, Japanese Patent No. 4049189 discloses the technology of providing a clamp circuit in a DC link, to thereby solve a problem of regenerative current in a direct AC power converter.

Japanese Patent Application Laid-Open No. 2009-95149 discloses the technology of providing a current-limiting resistor between an input end and a converter, to thereby generate an inrush current flowing into a capacitor of a clamp circuit. Further, after the capacitor is charged with a voltage, a current-limiting resistor is short-circuited by a switch for avoiding power consumption in the current-limiting resistor.

Japanese Patent No. 3772898 discloses the technology of providing series body composed of a diode, a resistor and a capacitor in a DC link in a single-phase capacitorless inverter. This resistor functions as a current-limiting resistor that suppresses an inrush current from flowing into the capacitor.

Note that Japanese Patent No. 3806872, Japanese Patent Application Laid-Open No. 05-56682 (1993) and Japanese Patent No. 2524771 are related to the present application. Japanese Patent No. 3806872 discloses the technology of reducing errors in estimating a rotating position of a motor by causing the current to be supplied to be large and have a lagging phase. Japanese Patent Application Laid-Open No. 05-56682 (1993) discloses the technology of handling instantaneous stop/reactivation of a power source in an indirect AC power converting circuit. Japanese Patent No. 2524771 describes power conversion by means of a diode bridge equivalent to a natural commutation mode of a converter. The technology related to the present invention is also disclosed in Rie Itoh and Isao Takahashi, "Decoupling Control of Input and Output Reactive Power of the Matrix Converter", IEEJ Technical Meeting on Semiconductor Power Converter, SPC-01-121, 2001, Koji Kato and Jun-ichi Itoh, "Improvement of Waveform for a Boost type AC/DC/AC Direct Converter", Year 2007 IEEJ National Convention 4-098, 2007, pp. 153 and 154 and Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282.

DISCLOSURE OF INVENTION

Problems to be Solved by the Invention

In the technology of Japanese Patent Application Laid-Open No. 2009-95149, it is possible to prevent an inrush current from flowing into a capacitor upon activation of a direct AC power converter, but from the viewpoint of power consumption, a current-limiting resistor is short-circuited in a normal operation of the direct AC power converter. Accordingly, for example, a large current flows into the capacitor when a voltage exceeding a clamp voltage of the capacitor is applied to a DC link due to a parasitic inductance of a circuit in switching of a current-source converter in a normal operation.

In the technology of Japanese Patent No. 3772898, a resistor connected in series with a capacitor and a switch connected in parallel with the resistor are provided in a DC link. In the technology of Japanese Patent No. 3772898, however, a diode rectifier circuit is employed as a converter. The diode rectifier circuit can rectify an input AC voltage but cannot change the rectified DC voltage (voltage of the DC link). Therefore, a large DC voltage is applied to the DC link upon activation. This resistor has a relatively large resistance value for suppressing an inrush current upon activation due to the large DC voltage. Besides, from the viewpoint of power consumption, a switch turns on to short-circuit the resistor in a normal operation.

In the technology described in Japanese Patent No. 3772898, a diode rectifier circuit is employed as described above, and there is no mention of an increase of the DC link voltage due to a parasitic inductance in switching of a converter.

Therefore, an object of the present invention is to provide a power converter that suppresses a current flowing into a capacitor by an increase of the DC link voltage due to a parasitic inductance in switching of a converter in a normal operation after activation.

Means to Solve the Problems

According to a first aspect of the present invention, a power converter includes: a plurality of input ends (Pu, Pv, Pw); a first DC power supply line (LH); a second DC power supply line (LL) applied with a potential lower than that of the first DC power supply line; a current-source converter (4) including a plurality of switching devices (Trp, Tsp, Ttp) connected between each of at least two of the plurality of input ends and the first DC power supply line and a plurality of switching devices (Trn, Tsn, Ttn) connected between the each of at least two of the plurality of input ends and the second DC power supply line; a diode (D1) provided between the first and second DC power supply lines with an anode thereof directed toward the first DC power supply line; a capacitor (C1) provided in series with the diode between the first and second DC power supply lines; and a first resistor (R1) connected in series with the capacitor and the diode between the first and second DC power supply lines.

According to a second aspect of the present invention, the power converter according to the first aspect further includes: a second resistor (R81, R82) provided in a series path linking at least one of the plurality of input ends and the capacitor; and a first switch (S81, S82) selecting conduction/non-conduction between the at least one of the plurality of input ends and the capacitor via the second resistor, wherein the first resistor (R1) has a resistance value lower than that of the second resistor.

According to a third aspect of the present invention, the power converter according to the first or second aspect further includes: a plurality of output ends (Pu, Pv, Pw) connected to an inductive load (7); and a voltage-source inverter (6) including a plurality of switching devices (Tup, Tvp, Twp) connected between each of the plurality of output ends and the first DC power supply line (LH) and a plurality of switching devices (Tun, Tvn, Twn) connected between each of the plurality of output ends and the second DC power supply line (LL), wherein the first resistor (R1) has a resistance value equal to or smaller than a value obtained by dividing a value obtained by subtracting a largest value of a line voltage applied between ones of the plurality of input ends (Pr, Ps, Pt) from a rated voltage of the voltage-source inverter by a regenerative current flowing from the inductive load via the voltage-source inverter.

According to a fourth aspect of the present invention, the power converter according to the first or second aspect further includes: a plurality of output ends (Pu, Pv, Pw) connected to an inductive load (7); a voltage-source inverter (6) including a plurality of switching devices (Tup, Tvp, Twp) connected between each of the plurality of output ends and the first DC power supply line (LH) and a plurality of switching devices (Tun, Tvn, Twn) connected between each of the plurality of output ends and the second DC power supply line (LL); and a second switch (S1) connected in parallel with the first resistor (R1).

According to a fifth aspect of the present invention, the power converter according to the first or second aspect further includes: a plurality of output ends (Pu, Pv, Pw) connected to an inductive load (7); a voltage-source inverter (6) including a plurality of switching devices (Tup, Tvp, Twp) connected between each of the plurality of output ends and the first DC power supply line (LH) and a plurality of switching devices (Tun, Tvn, Twn) connected between each of the plurality of output ends and the second DC power supply line (LL); and a bi-directional third switch (S5) connected in parallel with the diode and the first resistor (R1).

According to a sixth aspect of the present invention, in the power converter according to the fifth aspect, the third switch (S5) includes: a first transistor (T1) connected in anti-parallel with the diode (D1); a second diode (D2) connected in parallel with the first resistor with an anode thereof directed toward the second DC power supply line (LL) and a cathode thereof directed toward the first DC power supply line (LH); and a second transistor (T2) connected in anti-parallel with the second diode.

According to a seventh aspect of the present invention, in the power converter according to the fifth aspect, the diode (D1) and the first resistor (R1) are provided on the same side with respect to the capacitor (C1), and the third switch (S5) includes: a second diode (D2) connected in parallel with the first resistor with an anode thereof directed toward the second DC power supply line (LL) and a cathode thereof directed toward the first DC power supply line (LH); a third diode (D3) having an anode connected to the cathode of the second diode (D2); a fourth diode (D4) having an anode connected to a cathode of the diode (D1); and a transistor having a collector connected to a cathode of the third diode and a cathode of the fourth diode and an emitter connected to anodes of the diode and the second diode.

According to an eighth aspect of the present invention, in the power converter according to any one of the fourth to seventh aspects, the third switch (S5) is rendered conductive before the plurality of switching devices (Tup, Tvp, Twp, Tun, Tvn, Twn) of the voltage-source inverter (6) are all rendered non-conductive.

According to a ninth aspect of the present invention, in the power converter according to any one of the fifth to eighth aspects: the plurality of input ends include three input ends, and the plurality of output ends include three output ends; the current-source converter (4) performs commutation in accordance with any of a first commutation mode and a 120-degree conduction mode determined by results of comparison between a carrier and three trapezoidal waves having a 360-degree cycle and a phase different from each other by 120 degrees; in the first commutation mode, each of the trapezoidal waves has a pair of flat sections continuous for a 120-degree section and a pair of slope areas linking the pair of flat sections for a 60-degree section; the current-source converter performs commutation by comparison between the carrier and the trapezoidal waves changing between the pair of flat sections in the first commutation mode; the 120-degree conduction mode is employed upon rendering the third switch (S5) conductive in a state in which the first commutation mode is employed; and the first commutation mode is employed at and after the time when the third switch is rendered non-conductive.

According to a tenth aspect of the present invention, in the power converter according to the ninth aspect, the third switch (S5) is rendered conductive when a power factor of the inductive load (7) connected to the plurality of output ends (Pu, Pv, Pw) falls below a predetermined value.

According to an eleventh aspect of the present invention, in the power converter according to the tenth aspect, the inductive load (7) is a rotary machine, and the current-source converter (4) performs commutation in accordance with the 120-degree conduction mode during a predetermined period at the beginning of activation.

According to a twelfth aspect of the present invention, in the power converter according to the ninth aspect, the third switch (S5) is rendered conductive when a DC voltage between the first and second DC power supply lines (LH, LL) falls below a first threshold value.

According to a thirteenth aspect of the present invention, in the power converter according to the twelfth aspect, the third switch (S5) is rendered non-conductive when the DC voltage between the first and second DC power supply lines (LH, LL) keeps a value exceeding a second threshold value equal to or larger than the first threshold value for a predetermined period, and the first commutation mode is employed upon rendering the third switch non-conductive.

According to a fourteenth aspect of the present invention, in the power converter according to the thirteenth aspect, the third switch (S5) is rendered non-conductive upon the DC voltage between the first and second DC power supply lines (LH, LL) exceeding the second threshold value equal to or larger than the first threshold value.

According to a fifteenth aspect of the present invention, in the power converter according to the fourteenth aspect, the first commutation mode is employed upon rendering the third switch (S5) non-conductive.

According to a sixteenth aspect of the present invention, in the power converter according to the fourteenth aspect, the first commutation mode is employed after a lapse of a predetermined period from non-conduction of the third switch (S5).

According to a seventeenth aspect of the present invention, in the power converter according to any one of the first to sixteenth aspects, the diode (D1) and the first resistor (R1) are provided on the second DC power supply line (LL) side with respect to the capacitor (C1), the power converter further including: a second capacitor (C2) connected, between the first and second DC power supply lines (LH, LL), in series with the series connection of the diode (D1) and the first resistor (R1) on a side opposite to the capacitor; a fifth diode (D12) having an anode connected between the series connection and the second capacitor and a cathode connected to the DC power supply line; and a sixth diode (D13) having an anode connected to the second DC power supply line and a cathode connected between the series connection and the capacitor.

According to an eighteenth aspect of the present invention, in the power converter according to any one of the ninth to the seventeenth aspects; the 120-degree conduction mode is a second commutation mode; each of the trapezoidal waves has a pair of flat sections continuous for a 180-degree section in the second commutation mode; and in the second commutation mode, the current-source converter (4) performs commutation by comparison between the carrier and the trapezoidal waves changing between the pair of flat sections.

According to a nineteenth aspect of the present invention, in the power converter according to any one of the ninth to seventeenth aspects, the 120-degree conduction mode is a natural commutation mode in which the plurality of switching devices (Trp, Tsp, Ttp, Trn, Tsn, Ttn) of the current-source converter (4) are all conductive.

Effects of the Invention

According to the first aspect of the power converter of the present invention, in switching of the current-source converter, the first resistor is capable of limiting the current flowing into the capacitor even when an excessively large voltage is applied between the first and second DC power supply lines due to a parasitic capacitance (for example, inductance) of a circuit.

Moreover, even when the line voltage applied to a plurality of input ends increases due to abnormality and exceeds the voltage across the capacitor and a current flows into the capacitor, an increase of the current flowing into the capacitor can be suppressed by the first resistor.

According to the second aspect of the power converter of the present invention, the first switch is rendered non-conductive and the switching device group is appropriately rendered conductive when power is provided from a plurality of input ends, whereby it is possible to charge the capacitor via the second resistor. On this occasion, the current flows via the second resistor, and accordingly the capacitor can be charged by avoiding an inrush current to the capacitor. The first switch is rendered conductive and the second resistor can be short-circuited when the capacitor is charged with a desired voltage, which avoids power consumption in the second resistor after the capacitor is charged. In addition, the resistance value of the first resistor is set to be smaller than the resistance value of the second resistor, leading to reductions of a circuit size and a manufacturing cost.

In a normal operation after power is provided, the first resistor reduces the current flowing into the capacitor due to a parasitic capacitance of a circuit or an increase in line voltage. On this occasion, the capacitor has already been charged with a voltage, and thus the resistance value of the first resistor can be reduced more than the resistance value of the second resistor compared with the time when power is provided with a capacitor being not charged. In other words, the resistance value of the first resistor set to be smaller than the resistance value of the second resistor does not lead to a reduction in an extent in which an increase of the current flowing into the capacitor is suppressed.

According to the third aspect of the power converter of the present invention, the regenerative current flows through the first resistor, whereby the voltage applied to the voltage-source inverter can be suppressed even when the voltage between the first and second DC power supply lines increases.

According to the fourth aspect of the power converter of the present invention, the second switch is rendered conductive when the regenerative current flows from the inductive load to the capacitor via the voltage-source inverter, which prevents an increase of the voltage between the first and second DC power supply lines due to the first resistor.

According to the fifth aspect of the power converter of the present invention, the third switch is rendered conductive when the regenerative current flows from the inductive load to the capacitor via the voltage-source inverter, which prevents an increase of the voltage between the first and second DC power supply lines due to the first resistor. Further, the third switch is rendered conductive for responding to, for example, a reduction of power factor of the load connected to the output end or an instantaneous voltage drop of a power source connected to the input end, which stops a function inherent in the clamp circuit.

According to the sixth aspect of the power converter of the present invention, the diode as a clamp circuit is caused to function as a component of the bidirectional switch. This reduces the number of diodes.

According to the seventh aspect of the power converter of the present invention, the number of transistors can be reduced compared with the third switch of the power converter according to the sixth aspect.

According to the eighth aspect of the power converter of the present invention, the regenerative current avoids the first resistor more reliably.

According to the ninth aspect of the power converter of the present invention, it is possible to appropriately change commutation modes of the converter and make the absorption of regenerative current and direct AC power conversion compatible with each other even in a case where the third switch is rendered conductive and a function inherent in the clamp circuit is stopped for dealing with, for example, a decrease in power factor of the load connected to the output end or an instantaneous voltage drop of a power source connected to the input end, or even in a case where a function inherent in the clamp circuit is exerted without rendering the third switch conductive.

According to the tenth aspect of the power converter of the present invention, a malfunction of the first commutation mode, which results from a regenerative current increasing due to a decrease of power factor, is avoided.

According to the eleventh, thirteenth to sixteenth aspects of the power converter of the present invention, a response is made to a decrease of power factor resulting from the current having a delay phase for detecting a position of a rotary machine in the beginning of activation.

According to the twelfth aspect of the power converter of the present invention, a malfunction of the first communication mode, which results from a decrease of DC voltage, is avoided.

According to the seventeenth aspect of the power converter of the present invention, the first and second capacitors are charged through a path in which those are connected in series when the third switch is non-conductive, whereas the first and second capacitors are discharged through a path in which those are connected in parallel, and thus only a small breakdown voltage is required for the first and second capacitors. Further, the first and second capacitors are charged/discharged through a path in which those are connected in series when the third switch is conductive, which stops the function as a clamp circuit.

According to the eighteenth aspect of the power converter of the present invention, the converter performs commutation through comparison between trapezoidal waves and the carrier in any of the first and second commutation modes, and thus it is not necessary to individually make design correspondingly to those commutation modes.

According to the nineteenth aspect of the power converter of the present invention, it is not necessary to compare trapezoidal waves and the carrier in a 120-degree conduction mode.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a graph for describing an action when an instantaneous voltage drop occurs;

FIG. 6 is an enlarged view of FIG. 5;

FIG. 8 is a graph showing the relationship between a resistance value of a resistor R1 and a current ic1 flowing into a capacitor C1;

FIG. 9 is a figure showing a correction value for performing amplitude modulation correction in the first commutation mode;

FIG. 14 is a diagram illustrating a conceptual configuration of a direct AC power converter according to a second embodiment;

FIG. 15 is a diagram illustrating another conceptual configuration of the direct AC power converter according to the second embodiment;

FIG. 16 is a configuration diagram conceptually illustrating a direct AC power converter according to a third embodiment;

FIG. 17 is a configuration diagram conceptually illustrating a clamp circuit according to the third embodiment;

FIG. 18 is a graph showing the relationship between a clamp voltage supported by a clamp circuit and a load power factor;

FIG. 21 is a graph illustrating trapezoidal waves employed in a second commutation mode;

FIG. 22 is a graph illustrating line voltage commands in the second commutation mode;

FIG. 23 is a figure showing a correction value for performing amplitude modulation correction in the second commutation mode;

FIG. 29 is a configuration diagram conceptually illustrating another clamp circuit according to a fourth embodiment;

FIG. 30 is a configuration diagram conceptually illustrating still another clamp circuit according to the fourth embodiment;

EMBODIMENTS FOR CARRYING OUT THE INVENTION

First Embodiment
<Configuration>

Figure 1:
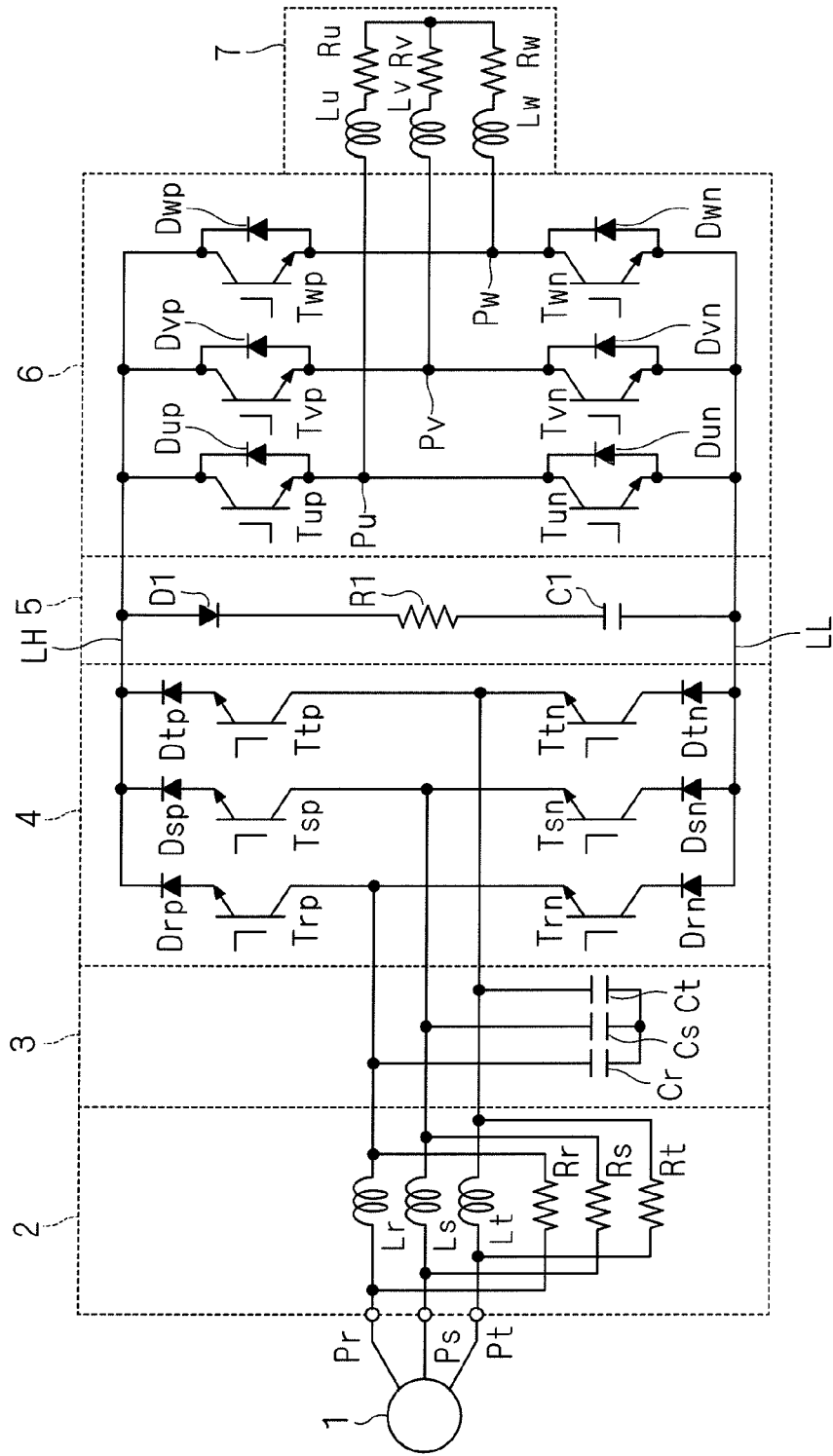
FIG. 1 is a diagram illustrating a conceptual configuration of a direct AC power converter.

As shown in FIG. 1, a direct AC power converter includes a current-source converter 4, a clamp circuit 5 and a voltage-source inverter 6. The current-source converter 4, the clamp circuit 5 and the voltage-source inverter 6 are connected to each other in this order.

The direct AC power converter receives phase voltages of three-phase AC from a power source 1 via three input ends Pr, Ps and Pt, a reactor group 2 and a capacitor group 3. The direct AC power converter outputs an AC voltage to an inductive load 7 via three output ends Pu, Pv and Pw. The direct AC power converter also includes DC power supply lines LH and LL that become a DC link. The function of the converter 4 causes the DC power supply line LH to have a higher potential than that of the DC power supply line LL.

The converter 4 includes, for example, six switching devices Trp, Tsp, Ttp, Trn, Tsn and Ttn. Those are also referred to as a first switching device group for the sake of description. The switching devices Trp, Tsp and Ttp are connected between the DC power supply line LH and the input ends Pr, Ps and Pt, respectively. The switching devices Trn, Tsn and Ttn are connected between the DC power supply line LL and the input ends Pr, Ps and Pt, respectively. The converter 4 constitutes a so-called current-source converter and includes six diodes Dip, Dsp, Dtp, Drn, Dsn and Dtn. Those are also referred to as a first diode group for the sake of description.

Cathodes of the diodes Drp, Dsp, Dtp, Drn, Dsn and Dtn are disposed on the DC power supply line LH side and anodes thereof are disposed on the DC power supply line LL side. The diode Drp is connected in series with the switching device Trp between the input end Pr and the DC power supply line LH. Similarly, the diodes Dsp, Dtp, Drn, Dsn and Dtn are connected in series with the switching devices Tsp, Ttp, Trn, Tsn and Ttn, respectively.

The inverter 6 includes six switching devices Tup, Tvp, Twp, Tun, Tvn and Twn. Those are also referred to as a second switching device group for the sake of description. The switching devices Tup, Tvp and Twp are connected between the DC power supply line LH and the output ends Pu, Pv and Pw, respectively. The switching devices Tun, Tvn and Twn are connected between the DC power supply line LL and the output ends Pu, Pv and Pw, respectively. The inverter 6 constitutes a so-called voltage-source inverter and includes six diodes Dup, Dvp, Dwp, Dun, Dvn and Dwn. Those are also referred to as a second diode group for the sake of description.

Cathodes of the diodes Dup, Dvp, Dwp, Dun, Dvn and Dwn are disposed on the DC power supply line LH side, and anodes thereof are disposed on the DC power supply line LL side. The diode Dup is connected in parallel with the switching device Tup between the output end Pu and the DC power supply line LH. Similarly, the diodes Dvp, Dwp, Dun, Dvn and Dwn are connected in parallel with the switching devices Tvp, Twp, Tun, Tvn and Twn, respectively.

For example, insulated gate bipolar transistors (hereinafter, merely referred to as IGBTs) are employed for the respective switching devices of the first switching device group and the second switching device group.

In the clamp circuit 5, a clamp diode D1, a capacitor C1 and a resistor R1 are connected in series with each other between the DC power supply lines LH and LL. The clamp diode D1 is disposed with an anode thereof directed toward the DC power supply line LH and a cathode thereof directed toward the DC power supply line LL. The series connection between the capacitor C1 and the clamp diode D1 realizes the configuration as a so-called CD snubber. In the present application, the above-mentioned CD snubber is grasped to be included in the clamp circuit (see "Technical Field" of the present specification).

The reactor group 2 and the capacitor group 3 are provided on the input side of the converter 4. The reactor group 2 includes reactors Lr, Ls and Lt and resistors Rr, Rs and Rt. The reactors Lr, Ls and Lt are provided between the converter 4 and the input ends Pr, Ps and Pt, respectively. The resistors Rr, Rs and Rt are connected in parallel with the reactors Lr, Ls and Lt, respectively. The capacitor group 3 is provided between the reactor group 2 and the converter 4 and includes capacitors Cr, Cs and Ct. In the illustration of FIG. 1, one ends of the capacitors Cr, Cs and Ct are connected to one ends of the reactors Lr, Ls and Lt, respectively, and the other ends thereof are connected to each other. The reactors Lr, Ls and Lt and the capacitors Cr, Cs and Ct constitute a secondary filter and suppress carrier components of current. The resistors Rr, Rs and Rt function as damping resistors and limit the width of oscillations of the output voltage of the resonant circuit, which is generated due to steep fluctuations of a voltage to be input.

The load 7 is, for example, a rotary machine, and is shown by an equivalent circuit indicating an inductive load. Specifically, a reactor Lu and a resistor Ru are connected in series, and one end of this series body is connected to the output end Pu. The same holds true for reactors Lv and Lw and resistors Rv and Rw. The other ends of those series bodies are connected to each other.

The downstream components of the clamp circuit 5 are not always limited to the inverter 6 and the load 7 in the broader concept of the present application. Therefore, first, the control of the converter 4 in a normal operation is descried below. Next, the effects of the present application are described prior to the description of the control of the inverter 6. After that, the inverter 6 and the load 7 are described.

<Commutation of Converter 4>

The converter 4 performs commutation in accordance with a first commutation mode described below in detail.

In the first commutation mode, commutation is determined in accordance with the results of comparison between a carrier and three trapezoidal waves which have a 360-degree cycle and whose phases are shifted from each other by 120 degrees. Each of those trapezoidal waves has a pair of flat sections that continue for a 120-degree section and a pair of slope areas for a 60-degree section that link the pair of flat sections. The converter 4 performs commutation by the comparison between a carrier and the slope area that changes between a pair of flat sections.

Figure 2:
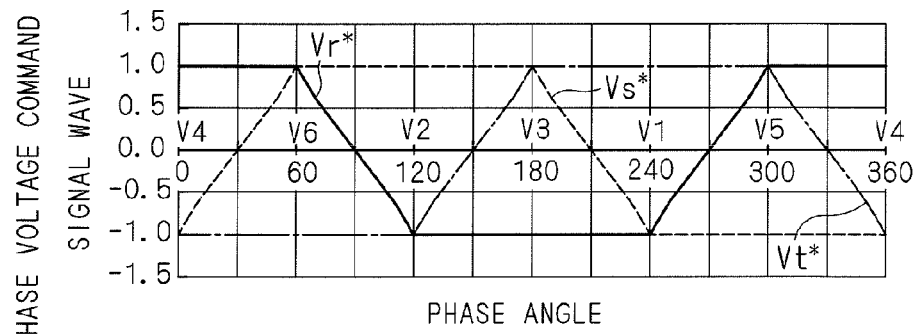
FIG. 2 is a graph illustrating trapezoidal waves employed in a first commutation mode.

The first commutation mode is the commutation technology already disclosed in Japanese Patent Application Laid-Open No. 2007-312589 and WO 2007/123118. The converter 4 performs commutation based on the results of comparison between the carrier and the slope area of the 60-degree section in the trapezoidal wave. FIG. 2 is a graph illustrating the trapezoidal waves. A horizontal axis shows a phase angle for 360 degrees. In the graph, each of phase voltage vectors V4, V6, V2, V3, V1 and V5 shown in the approximately triangular area indicates a ratio of a switching pattern of corresponding to the phase voltage vector in the shown area. That is, only switching corresponding to the phase voltage vector V4 is performed at the phase angle of 0 degrees, switching corresponding to the phase voltage vector V4 and switching corresponding to the phase voltage vector V6 are performed at a ratio 1:1 at the phase angle of 30 degrees, and only switching corresponding to the phase voltage vector V6 is performed at the phase angle of 60 degrees.

Note that each digit of a three-digit number obtained by converting the number added to the phase voltage vector into a binary number indicates conduction/non-conduction for each phase of the switching device group in a virtual voltage-source converter. For example, "100" is obtained by the conversion of "4" of the phase voltage vector V4 into a binary number. 1 of the binary number indicates that the switching devices connected to the DC power supply line LH are rendered conductive and zero of the binary number indicates that the switching devices connected to the DC power supply line LL are rendered conductive. The third-digit number, second-digit number and first-digit number of a binary number indicate an r-phase, s-phase and t-phase, respectively. In other words, in the phase voltage vector V4, a virtual voltage-source converter supplies an r-phase voltage of a power source to the DC power supply line LH and supplies an s-phase voltage and a t-phase voltage to the DC power supply line LL.

As already described in Japanese Patent Application Laid-Open No. 2007-312589 and WO 2007/123118, comparison of a command value of a current-source converter and the carrier can be performed based on the comparison between a carrier and phase voltage commands Vr*, Vs* and Vt* of the virtual voltage-source converter from the duality of current and voltage. As described above, it is the slope area in the 60-degree section of the trapezoidal wave that is compared with the carrier. Therefore, it suffices that, as an object to be compared with the carrier, one corresponding to a so-called middle phase, which does not take a largest value or a smallest value, is extracted from the phase voltage commands Vr*, Vs* and Vt*.

Figure 3:
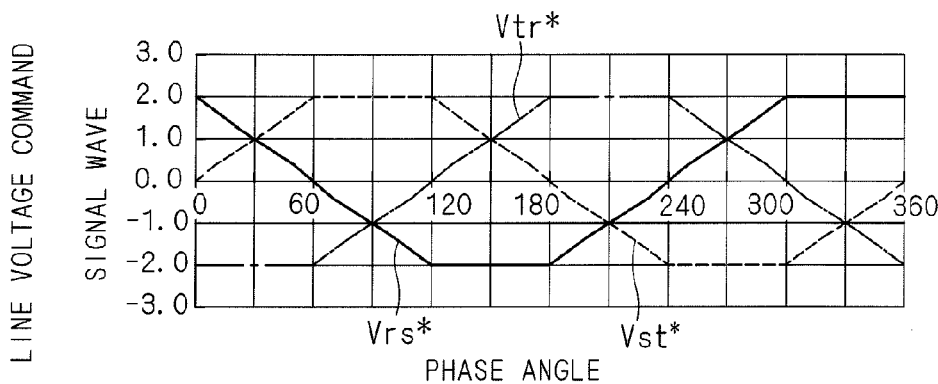
FIG. 3 is a graph showing line voltage commands in the first commutation mode.

More specifically, line voltage commands Vrs*, Vst* and Vtr* obtained from those phase voltage commands Vr*, Vs* and Vt* are equivalent to line current commands of a current-source converter (for example, see Lixiang Wei and Thomas A. Lipo, "A Novel Matrix Converter Topology with Simple Commutation", IEEE IAS 2001, Vol. 3, 2001, pp. 1749-1754). Therefore, command values of the current-source converter can be obtained from the phase voltage commands Vr*, Vs* and Vt* by applying a logical operation based on Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106 and 107. FIG. 3 is a graph showing the line voltage commands Vrs*, Vst* and Vtr*.

As already described in Lixiang Wei and Thomas A. Lipo, "A Novel Matrix Converter Topology with Simple Commutation", IEEE IAS 2001, Vol. 3, 2001, pp. 1749-1754, Japanese Patent Application Laid-Open No. 2007-312589 and WO 2007/123118, while a line current substantially has a sinusoidal waveform by commutation of the converter in the first commutation mode, an average value of the DC link voltage has ripples (see average value Vdc1 of FIG. 4 as well). Specifically, the average value takes a maximum at the center of each 60-degree section, and takes a value of $\sqrt{3}/2$ of the maximum as the smallest value at both ends of the section (in Lixiang Wei and Thomas A. Lipo, "A Novel Matrix Converter Topology with Simple Commutation", IEEE IAS 2001, Vol. 3, 2001, pp. 1749-1754, Japanese Patent Application Laid-Open No. 2007-312589 and WO 2007/123118, an amplitude of a voltage with ripples is 3/2 of the phase voltage, and thus the smallest value is $\sqrt{3}/2$ of the maximum based on the DC link voltage to which a line voltage of three-phase voltage is applied).

Figure 4:
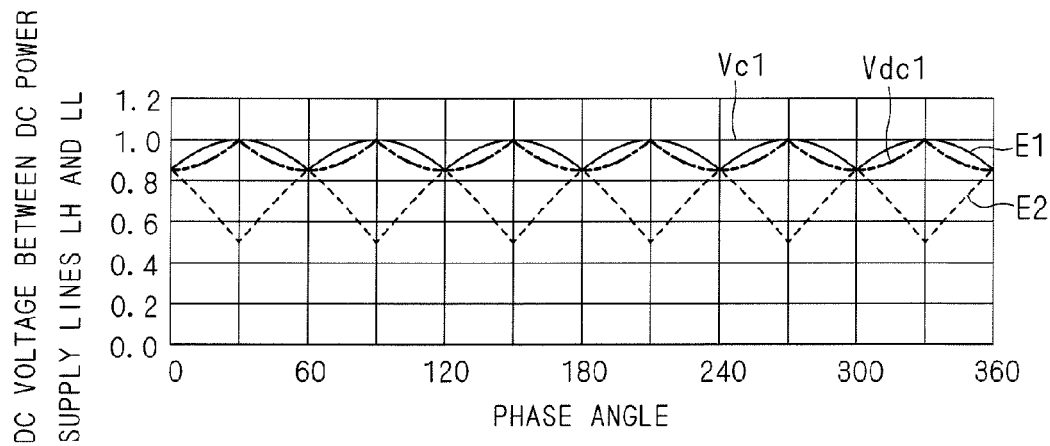
FIG. 4 is a graph showing a voltage between first and second DC power supply lines.

FIG. 4 is a graph showing envelopes E1 and E2 (corresponding to the largest voltage and the second largest voltage of the line voltages, respectively) of a DC link voltage Vdc, an average value Vdc1 obtained by removing fluctuations due to pulse width modulation from the DC link voltage Vdc, and a voltage between both ends Vc1 of the capacitor C1. The DC link voltage Vdc changes between the envelopes E1 and E2 by switching of the converter 4, which is omitted. To put the operation of the converter 4 in another way, the converter 4 repeatedly outputs the largest line voltage E1 and the second largest intermediate line voltage E2 among three received line voltages, between the DC power supply lines LH and LL in an alternate manner.

The average value Vdc1 in the figure is represented by $(\sqrt{3}/2)$Em/Vm (see Lixiang Wei and Thomas A. Lipo, "A Novel Matrix Converter Topology with Simple Commutation", IEEE IAS 2001, Vol. 3, 2001, pp. 1749-1754, Japanese Patent Application Laid-Open No. 2007-312589 and WO 2007/123118 for detailed derivation). Here, Em represents a largest value (that is, a largest value of the largest line voltage E1) of a difference between the largest phase voltage and the smallest phase voltage, and Vm represents an absolute value of the largest phase voltage. The average value Vdc1 is a value obtained by averaging the DC link voltage Vdc in one cycle of a carrier of the converter.

In order to achieve three-phase equilibrium by correcting the ripples of the average value Vcd1 of the DC link voltage Vdc, it is desired to perform amplitude modulation correction on the inverter 6 side. This point is not the essence of the broader concept of the present application, and is accordingly described below.

Through the operation according to the first commutation mode of the converter 4, the capacitor C1 is charged with a largest value of the largest line voltage E1 (voltage between both ends Vc1 in FIG. 4). The clamp diode D1 inhibits the current flowing from the capacitor C1 to the DC power supply line LH, and thus the voltage between both ends Vc1 of the capacitor C1 is maintained at the largest value of the largest line voltage E1 unless the DC link voltage Vdc does not exceed the voltage between both ends Vc1 of the capacitor C1. Hereinafter, the voltage between both ends Vc1 of the capacitor C1 is referred to as a clamp voltage Vc1 as well.

In control of the converter 4 as described above, an instantaneous voltage drop occurs in the power source 1 at times. For example, in a case where another load different from the load 7 is connected to the power source 1 in parallel with the direct AC power converter, an instantaneous voltage drop may occur in the power source 1 upon instantaneous flowing of a large current to this another load. The instantaneous voltage drop of the power source 1 as described above is apt to occur particularly in the case of employing the power source 1 having a high power supply impedance. Along with the above-mentioned instantaneous voltage drop, the resonant circuit composed of the reactor group 2 and the capacitor group 3 increases, more specifically, oscillates the voltages across the capacitors Cr, Cs and Ct in some cases. The voltages across the capacitors Cr, Cs and Ct can be regarded as the phase voltages that are fed to the converter 4.

FIG. 5 is a graph showing a phase voltage Vr, a voltage between both ends Vcr of the capacitor Cr, a DC link voltage Vdc, a clamp voltage Vc1 and a current ic1 flowing into the capacitor C1 in a case where an instantaneous voltage drop occurs in the power source 1. Note that shown are the results in a case where the resistor R1 is not provided (in other words, in a case where the resistance value of the resistor R1 is almost zero). While an instantaneous voltage drop may actually occur in the phase voltages Vs and Vt, only the phase voltage Vr is shown for the sake of simplicity of the figure.

When an instantaneous voltage drop occurs in the phase voltage Vr, an oscillation resulting from the instantaneous voltage drop occurs in the voltage between both ends Vcr. While a sawtooth oscillation occurs in the voltage between both ends Vcr in addition to the oscillation resulting from an instantaneous voltage drop, this oscillation results from switching of the converter 4 and does not result from an instantaneous voltage drop. For example, in a case where the phase voltage Vr is equivalent to a middle phase, the period in which the phase voltage Vr (more specifically, voltage between both ends Vcr) is not applied to any of the DC power supply lines LH and LL and the period in which it is applied to any of them appear in an alternate manner, whereby a sawtooth oscillation occurs in the voltage between both ends Vcr by this switching. Meanwhile, an oscillation hardly occurs in the capacitor Cr during the period in which the phase voltage Vr (more specifically, voltage between both ends Vcr) is constantly applied to any of the DC power supply lines LH and LL (for example, period in which the phase voltage Vr is the largest and the phase voltages Vs and Vt are negative, in other words, around the crest value of the phase voltage Vr).

In a case where an instantaneous voltage drop occurs in the phase voltage Vr, in addition to the oscillation resulting from switching of the converter 4, a damped oscillation resulting from the instantaneous voltage drop occurs in the voltage between both ends Vcr. Such damped oscillation is not what to be intended, which leads to an increase of the voltage between both ends Vcr.

FIG. 6 shows the graph in the range of time 20.00 ms to time 25.00 ms in FIG. 5 in an enlarged manner. In the illustration of FIGS. 5 and 6, at the time t1 when the phase voltage Vr has recovered from an instantaneous voltage drop and the voltage between both ends Vcr increases, the converter 4 switches from a middle line voltage E2 and outputs the largest line voltage E1 as the DC link voltage Vdc to the DC power supply lines LH and LL. On this occasion, the DC link voltage Vdc exceeds the clamp voltage Vc1 along with an increase of the voltage between both ends Vcr, which causes the current ic1 to flow into the capacitor C1. In the illustration of FIGS. 5 and 6, the current ic1 exceeds 100 A.

In the illustration of FIGS. 5 and 6, the DC link voltage Vdc exceeds the clamp voltage Vc1 when the largest line voltage E1 is output between the DC power supply lines LH and LL. Even in a case where the middle line voltage E2 is applied between the DC power supply lines LH and LL as the DC link voltage Vdc, the DC link voltage Vdc may exceed the clamp voltage Vc1 due to an increase of the voltages across the capacitors Cr, Cs and Ct. Actually, however, such a phenomenon hardly occurs. This is because the resistors Rr, Rs and Rt function as damping resistors for the resonant circuit and suppress the width of oscillations of the voltages between both ends Cr, Cs and Ct resulting from an instantaneous voltage drop. Thanks to those damping resistors, for example, an increase amount of the line voltage fed to the converter 4 is limited to be equal to or smaller than approximately one-tenth of the largest value of the largest line voltage E1. The largest value of the middle line voltage E2 is $\sqrt{3}/2$ times the largest value of the largest line voltage E1, and thus even if a voltage increase occurs due to the resonant circuit at the time when the middle line voltage E2 is the largest, the middle line voltage E2 does not exceed the clamp voltage Vc1 (largest value of the middle line voltage E1).

Figure 7:
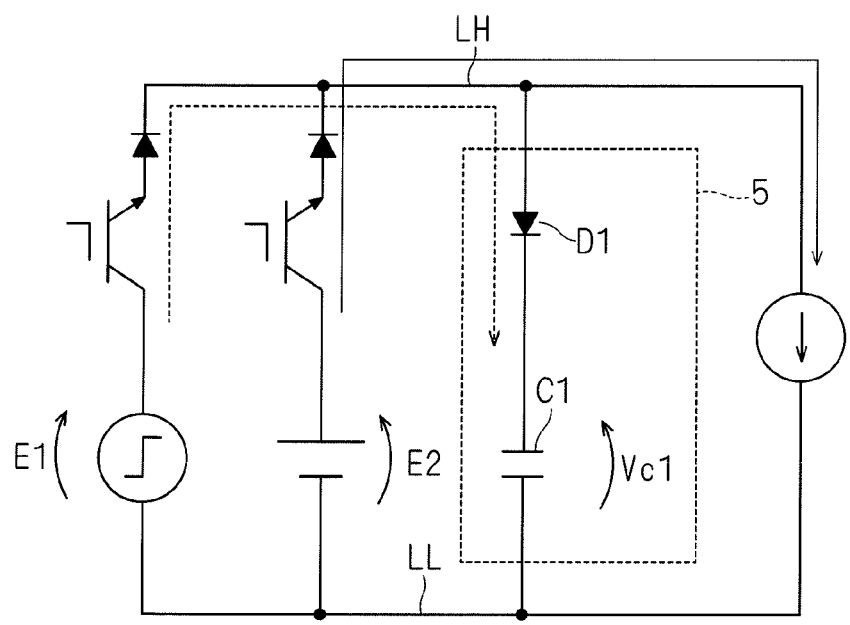
FIG. 7 is an equivalent circuit of the direct AC power converter when an instantaneous voltage drop occurs.

FIG. 7 shows an equivalent circuit of the direct power converter in a case where the current ic1 flows into the capacitor C1 due to an instantaneous voltage drop. The largest line voltage E1 is regarded as a noise source that exceeds the clamp voltage Vc1, whereas the middle line voltage E2 is regarded as a DC power source that does not exceed the clamp voltage Vc1.

As described above, the converter 4 alternately outputs the largest line voltage E1 and the middle line voltage E2 between the DC power supply lines LH and LL. Therefore, in this equivalent circuit, the transistor that causes application of the largest line voltage E1 between the DC power supply lines LH and LL and the diode connected in series with this are shown to be connected in series with the noise source, and the transistor that causes application of the middle line voltage E2 between the DC power supply lines LH and LL and the diode connected in series with this are shown to be connected in series with the DC power source. Further, the clamp circuit 5 is provided between the DC power supply lines LH and LL, but the clamp circuit 5 in which the resistor R1 is not provided is illustrated here. Further, in this equivalent circuit, a current source composed of the inverter 6 and the inductive load 7 is provided between the DC power supply lines LH and LL downstream of the clamp circuit 5.

In such an equivalent circuit, the middle line voltage E2 does not exceed the clamp voltage Vc1, and thus a current does not flow into the clamp circuit 5 during the period in which the middle line voltage E2 is selected, but a current flows from the DC power source to the inverter 6 and the inductive load 7. Further, the largest line voltage E1 exceeds the clamp voltage Vc1, and thus a current flows from the noise source to the clamp circuit 5 during a period in which the largest line voltage E1 is selected.

As described above, a large current ic1 may flow into the capacitor C1 due to an instantaneous voltage drop during the period in which the largest line voltage E1 is selected. Such a current ic1 is not desirable, and the current ic1 is desired to drop. Therefore, in the present application, the resistor R1 is provided in series with the capacitor C1 between the DC power supply lines LH and LL (see FIG. 1). The above-mentioned resistor R1 reduces the current ic1 flowing into the capacitor C1 due to an instantaneous voltage drop of a power source.

The resistance value of the resistor R1 is now considered. For example, as already described in Japanese Patent Application Laid-Open No. 2009-95149, in the circuit composed of a reactor, a capacitor, a resistor and a DC power source that are connected in series with each other, logically, the current that initially flows in the state in which the capacitor is not charged at all depends only on the power supply voltage and the resistance value of a resistor. More specifically, the value obtained by dividing the power supply voltage by the resistance value is regarded as an inrush current.

In the direct AC power converter, a difference ΔE between the voltage between both ends Vc1 of the charged capacitor C1 and the DC link voltage Vdc exceeding the voltage between both ends Vc1 (see FIG. 6) corresponds to the power supply voltage in the circuit. The difference ΔE is approximately one-tenth of the power supply voltage, and accordingly the current ic1 resulting from an instantaneous voltage drop is smaller compared with, for example, the inrush current into the capacitor C1 in activation of a direct AC power converter. Therefore, it suffices that the resistance value of the resistor R1 that suppresses the current ic1 is smaller than the resistance value of the resistor for suppressing the inrush current. This point is described in detail in the second embodiment.

FIG. 8 is a graph showing the relationship between the resistance value of the resistor R1 and the largest value of the current ic1 in the direct AC power converter. As is understood from FIG. 8, the largest value of the current ic1 decreases along with an increase of the resistance value of the resistor R1 and gradually approaches a predetermined value. In this case, calculation is made where the effective value of the line voltage of the power source 1 is 456 V, the inductance of the reactors Lr, Ls and Lt is 1 mH, the electrostatic capacitance of the capacitors Cr, Cs and Ct is 10 μF, the electrostatic capacitance of the capacitor C1 is 390 μF, the resistance component of the load 7 is 10.8Ω, and the inductance component is 13.6 mH. Note that the resistors R81 and R82 are short-circuited in a normal operation, which are ignored.

With reference to FIG. 8, the current is drops relatively rapidly in the range where the resistor R1 has a resistance value smaller than 4Ω and drops relatively slowly in the range where the resistor R1 has a resistance value larger than 4Ω Accordingly, the resistance value of 4Ω or more in the resistor R1 enables to effectively reduce the current is 1.

In a normal operation, the capacitor C1 is charged so that the clamp voltage Vc1 coincides with the largest value of the largest line voltage E1. For this reason, a current does not flow from the converter 4 side to the capacitor C1 unless an unintended large voltage is fed to the converter 4. This means that a current does not flow into the resistor R1 connected in series with the capacitor C1 as well. Therefore, as in the present application, even when the resistor R1 is provided, it is possible to avoid power consumption by the resistor R1 due to the current flowing from the converter 4 to the resistor R1 in a normal operation of the converter 4.

<Commutation of Inverter 6>

As shown in FIG. 4, the average value Vdc1 of the DC link voltage Vdc has ripples by the commutation of the converter 4 in the first commutation mode. Specifically, the average value Vdc1 takes a maximum value at the center of each 60-degree section and takes a value of $\sqrt{3}/2$ of the maximum value as the smallest value at both ends of the section. In order to achieve three-phase equilibrium by correcting the ripples, it is desired to perform amplitude modulation correction on a line voltage command on the inverter 6 side. FIG. 9 is a graph illustrating a correction value for performing the above-mentioned amplitude modulation correction. Such correction is described in, for example, Lixiang Wei and Thomas A. Lipo, "A Novel Matrix Converter Topology with Simple Commutation", IEEE IAS 2001, Vol. 3, 2001, pp. 1749-1754.

Here, consideration is made on the state in which the switching devices Ttp, Trn and Tsn are non-conductive and the switching devices Trp and Tsp are rendered conductive in a complementary manner while the switching device Ttn is conductive in the converter 4. The ratio between the period in which the switching device Trp is conductive and the period in which the switching device Tsp is conductive is equal to the ratio between a value of a line voltage command Vrs* and a value of a line voltage command Vst* of FIG. 3. Therefore, description is further given considering that the ratio between the period in which the switching device Trp is conductive and the period in which the switching device Tsp is conductive is drt:dst.

Figure 10:
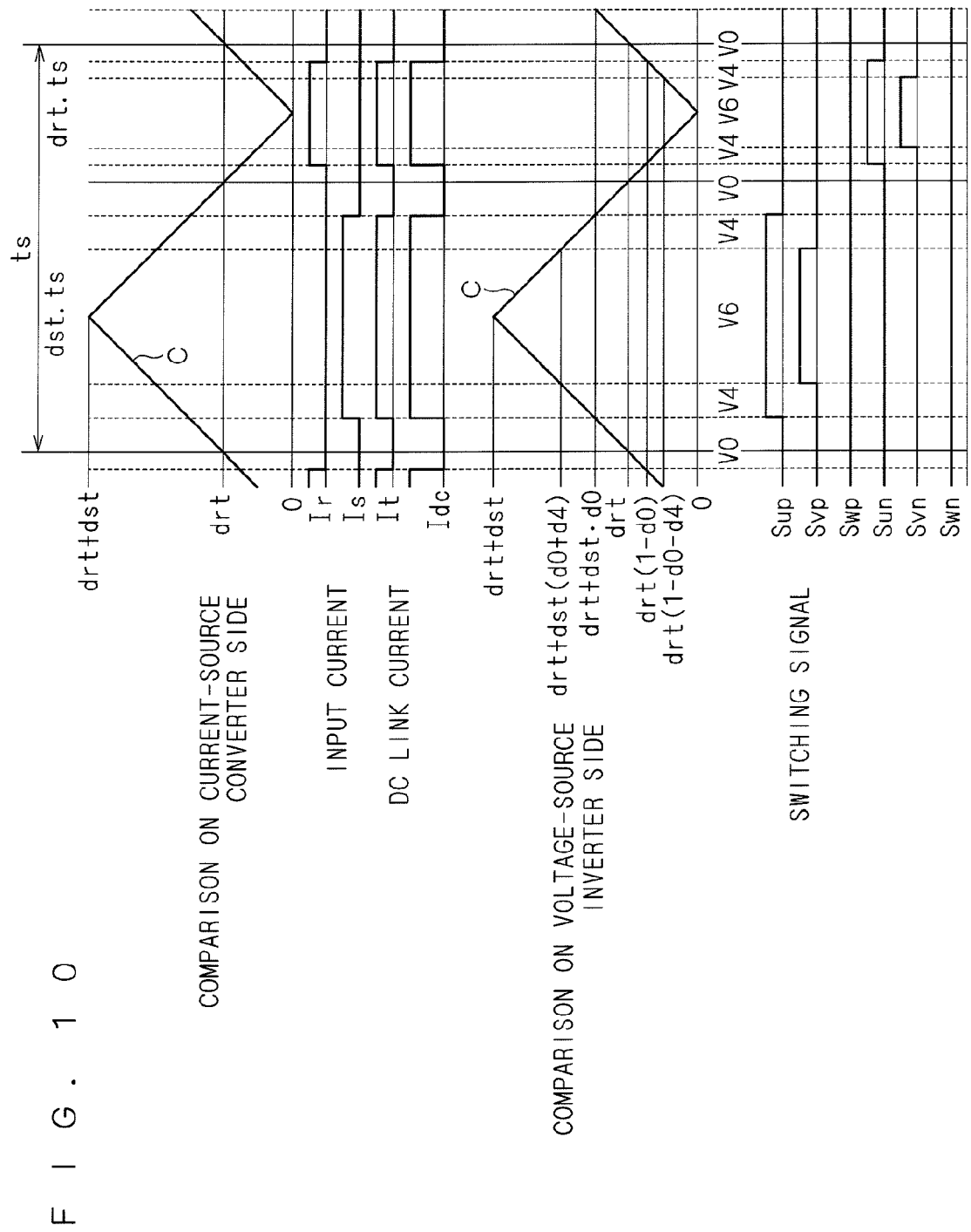
FIG. 10 is a graph describing operations of a converter and an inverter in the first commutation mode.

FIG. 10 is a graph describing operations of the converter 4 and the inverter 6 in the first commutation mode. Here, a triangular wave (which may be a sawtooth wave) whose value fluctuates from zero to drt+dst and which has a cycle is employed as a carrier C used in commutation of the converter 4. Control is made such that the switching device Trp is rendered conductive when the carrier C takes a value of zero to drt and the switching device Tsp is rendered conductive when the carrier C takes a value of drt to drt+dst, whereby the ratio between the period in which the switching device Trp is conductive and the period in which the switching device Tsp is conductive can be made drt: dst.

Input currents Ir, Is and It represent currents flowing into the input ends Pr and Ps and the current flowing out of the input end Pt, respectively. Further, a DC link current Idc is the current flowing through the DC link section and, in this case, is the current flowing through the DC power supply lines LH and LL when the current flowing through the clamp circuit 5 is not taken into consideration.

The carrier C used in commutation on the inverter 6 side is also used as the carrier C used in commutation of the converter 4. FIG. 10 illustrates a case where the voltage vectors V0, V4 and V6 are repeatedly employed in commutation of the inverter 6. Note that there is no direct relevance between the voltage vectors of the inverter 6 and the virtual phase voltage vectors employed in commutation of the converter 4. Each digit of a three-digit number obtained by converting the number added to a phase voltage vector employed in commutation of the inverter 6 into a binary number indicates conduction/non-conduction for each phase of the second switching device group. For example, the voltage vector V4 indicates a pattern in which the inverter 6 connects the DC power supply line LH to the output end Pu and connects the DC power supply line LL to the output ends Pv and Pw.

In this case, as already described in Japanese Patent Application Laid-Open No. 2007-312589 and WO 2007/123118, when the ratios of the periods in which the voltage vectors V0, V4 and V6 are employed are indicated by d0, d4 and d6 (note that d6=1−d0−d4), respectively, it suffices that the voltage vector V0 is employed during a period in which the carrier C takes a value drt(1−d0) to drt+dst·d0, the voltage vector V4 is employed during a period in which the carrier C takes a value drt+dst·d0 to drt+dst(d0+d4) and a period in which the carrier C takes a value drt(1−d0−d4) to drt(1−d0), and the voltage vector V6 is employed during a period in which the carrier C takes a value 0 to drt(1−d0−d4) and a period in which the carrier C takes a value drt+dst(d0+d4) to drt+dst.

In other words, the conduction pattern of the second switching device group may be switched upon the carrier C taking value drt(1−d0−d4), drt(1−d0), drt, drt+dst·d0 or drt+dst(d0+d4).

Note that the switching devices Tup, Tvp, Twp, Tun, Tvn and Twn are rendered conductive/non-conductive by activation/deactivation (indicated by high potential/low potential in the graph) of switching signals Sup, Svp, Swp, Sun, Svn and Swn of FIG. 10, respectively.

Here, a case where commutation of the inverter 6 is repeated by employing the voltage vectors V0, V4 and V6 is illustrated, and thus the switching device Twp is always non-conductive and the switching device Twn is always conductive. Accordingly, the switching signals Swp and Swn are shown as deactivation and activation, respectively.

The switching devices Tup, Tvp and Twp are all non-conductive during the period in which the voltage vector V0 is employed, and accordingly the DC link current Idc is zero during that period. Along with this, the input currents Ir, Is and It are zero irrespective of the fact that the converter 4 performs commutation at the time when the carrier C takes the value drt. Moreover, the period in which the voltage vector V0 is employed is internally divided at drt and dst, and accordingly the period in which the input currents Ir and Is become zero is distributed at the same ratio of drt and dst. This suppresses waveform deterioration of the input currents.

As shown in FIG. 10, during the period in which the voltage vector V0 is employed, the converter 4 switches between the largest line voltage (line voltage Vst in switching of FIG. 10) and a middle line voltage (line voltage Vrt in switching of FIG. 10) as an output voltage. That is, the largest line voltage and middle line voltage are switched during the period in which the DC link current Idc is zero. However, the DC link current Idc may flow even during the period in which the zero voltage vector V0 is employed due to the parasitic inductance of a circuit (for example, inductance component of the DC power supply line LH). The DC link current idc flows into the capacitor C1. This is because a current does not flow from the DC power supply line LH to the DC power supply line LL via the inverter 6 when the voltage vector V0 is employed.

A large current is apt to flow into the capacitor C1 particularly when the middle line voltage is switched to the largest line voltage. This is because the largest line voltage is larger than the middle line voltage.

However, in the direct AC power converter according to the present embodiment, the resistor R1 is provided in series with the capacitor C1. Therefore, the resistor R1 is also capable of reducing the current flowing into the capacitor C1 due to the parasitic inductance of a circuit.

There is also conceivable a case where an excessively large voltage is applied to the DC link due to the parasitic inductance of a circuit and switching of the converter 4, whereby a current flows into the capacitor C1. Therefore, the current into the capacitor C1 in accordance with the above-mentioned mechanism is not necessarily predicated on the presence of the inverter 6.

<Stop of Inverter 6 Due to Over-Current>

In a case where an over-current is generated toward, for example, the load 7 in the inverter 6, the switching devices Tup, Tun, Tvp, Tvn, Twp and Twn are rendered non-conductive for stopping a current supply to the load 7 (hereinafter, referred to as stop of the inverter 6). In this case, the inductive energy stored in the load 7 is regenerated into the clamp circuit 5 via the diodes Dup, Dun, Dvp, Dvn, Dwp and Dwn.

Figure 11:
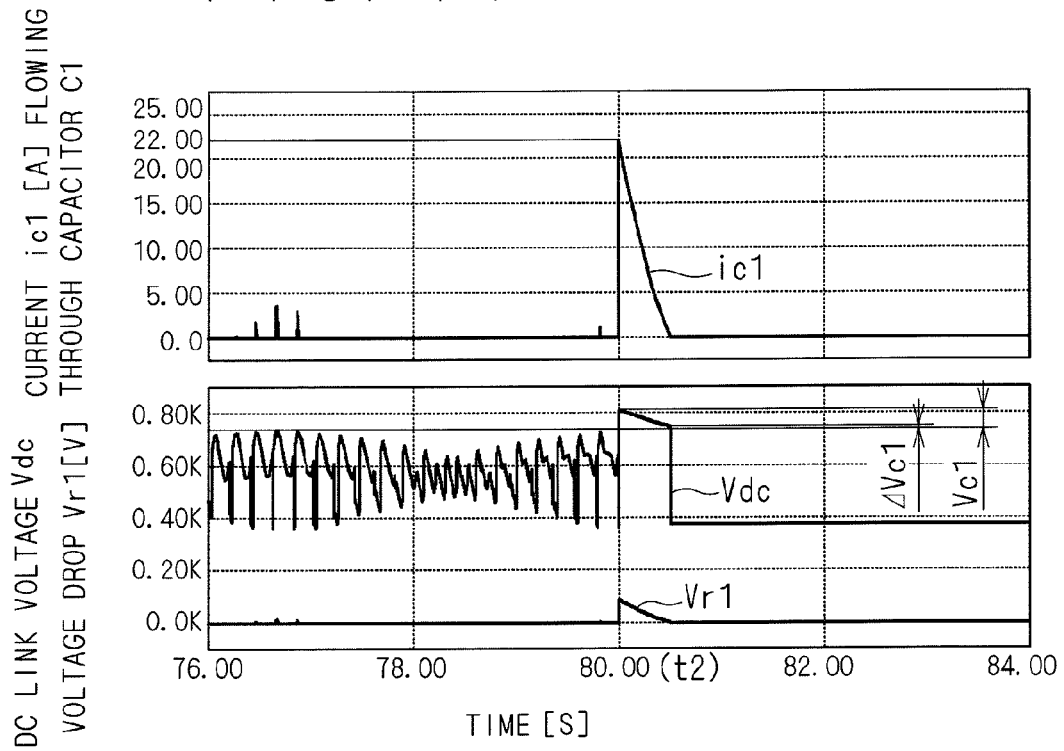
FIG. 11 is a graph for describing an action when the inverter is stopped.

For example, in the case where the inverter 6 is stopped upon the current that flows into the load 7 reaching a predetermined over-current set value, a regenerative current that is equal to the over-current set value flows into the clamp circuit 5 at the maximum. FIG. 11 shows the current ic1 flowing into the capacitor C1 (hereinafter, referred to as regenerative current ic1 as well), DC link voltage Vdc and voltage drop Vr1 of the resistor R1 in a case where the inverter 6 is stopped due to an over-current. In FIG. 11, an over-current set value is 22 A, and other circuit constants are identical to the circuit constants in the graph of FIG. 8.

As shown in FIG. 11, when the inverter 6 is stopped at, for example, the time t2, the regenerative current ic1 flows from the load 7 to the capacitor C1 via the inverter 6. The regenerative current ic1 is 22 A at the time t2. The regenerative current ic1 results from the inductive energy of the load 7, and accordingly decreases with the lapse of time to zero. Therefore, the voltage drop Vr1 calculated with the regenerative current ic1 as a factor also decreases with the lapse of time to zero, similarly to the current ic1.

The DC link voltage Vdc is a sum of the voltage drop Vr1 of the resistor R1 and the voltage between both ends Vc1 of the capacitor C1. The voltage between both ends Vc1 of the capacitor C1 rises based on the integration of the regenerative current ic1, and thus the rising speed thereof is slower than that of the voltage drop Vr1 and hardly changes immediately after the time t2. Therefore, the largest value of the DC link voltage Vdc is a sum of the voltage drop Vr1 (=resistance valuexover-current set value) at the time t2 and the voltage between both ends Vc1 (=largest value of the largest line voltage E1) at the time t2.

In the illustration of FIG. 11, the DC link voltage Vdc increases at the time t2 by the amount of the voltage drop Vr1 and thereafter decreases with the lapse of time. Such an increase of the DC link voltage Vdc is not desirable, and a reduction thereof is desired.

Figure 12:
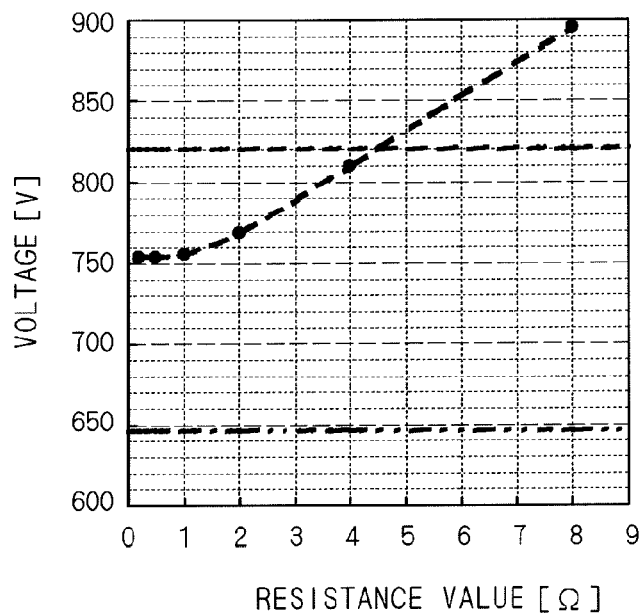
FIG. 12 is a graph showing the relationship between the resistance value of the resistor R1 and a DC link voltage Vdc.

FIG. 12 shows the relationship between the largest value of the DC link voltage Vdc that results from the regenerative current and the resistance value of the resistor R1. The largest value of the DC link voltage Vdc is proportional to the resistance value of the resistor R1 in the range where a resistance value is large. This is because the largest of the voltage drop Vr1 of the resistor R1 is larger than a rise amount $\Delta Vc1$ of the voltage between both ends Vc1. That is, as illustrated in FIG. 11, the sum of the voltage drop Vr1 at the time t2 and the voltage between both ends Vc1 at the time t2 is the largest value of the DC link voltage Vdc.

Meanwhile, the largest value of the DC link voltage Vdc does not depend on a resistance value and is constant in the range where a resistance value of the resistor R1 is small. This is because the largest of the voltage drop Vr1 (that is, voltage drop Vr1 at the time t2) of the resistor R1 is smaller than the rise amount $\Delta Vc1$ of the voltage between both ends Vc1 of the capacitor C1. On this occasion, the largest value of the DC link voltage Vdc is the voltage between both ends Vc1 of the capacitor C1 irrespective of the voltage drop Vr1 of the resistor R1.

It suffices that the resistance value of the resistor R1 is set such that the largest value of the DC link voltage Vdc does not exceed, for example, the rated voltage of the inverter 6. Specifically, the resistance value of the resistor R1 may be set to be equal to or smaller than a value obtained by dividing the value (Vmax−Vc1) obtained by subtracting the voltage between both ends Vc1 at the time t2 from the rated voltage Vmax of the inverter 6 by the largest value of the regenerative current (that is, over-current set value). Note that the voltage between both ends Vc1 at the time t2 is the largest value of the largest line voltage E1 fed to the converter 4.

For example, assuming that the rated voltage Vmax of the inverter 6 is 820 V, the DC link voltage Vdc is caused to be equal to or smaller than the rated voltage Vmax by setting the resistance value of the resistor R1 to be equal to or smaller than $4\Omega$ in the illustration of FIG. 12.

<Other Configuration of Clamp Circuit 5>

Figure 13:
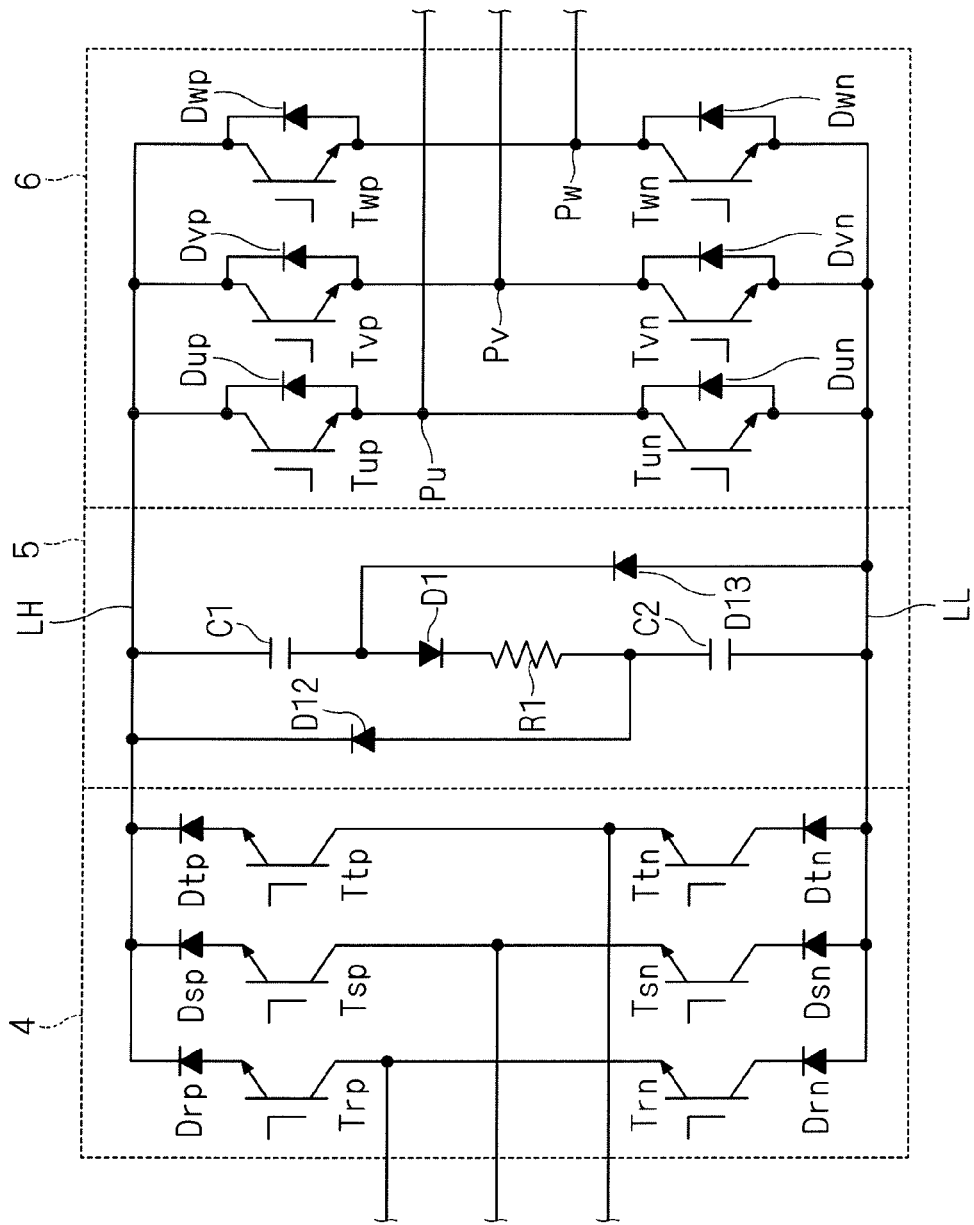
FIG. 13 is a diagram showing another conceptual example of the direct AC power converter.

A direct AC power converter shown in FIG. 13 is different from that of FIG. 1 in the configuration of the clamp circuit 5. The clamp circuit 5 includes capacitors C1 and C2, a clamp diode D1, diodes D12 and D13 and a resistor R1.

The capacitors C1 and C2 are connected in series with each other between the DC power supply lines LH and LL. The capacitor C1 is provided on the DC power supply line LH side with respect to the capacitor C2. The clamp diode D1 is connected in series with the capacitors C1 and C2 therebetween. The clamp diode D1 has an anode disposed toward the DC power supply line LH and a cathode disposed toward the DC power supply line LL. The resistor R1 is connected in series with the clamp diode D1 between the capacitors C1 and C2. The diode D12 has an anode connected between capacitor C2 and a series body of the clamp diode D1 and the resistor R1 and a cathode connected to the DC power supply line LH. The diode D13 has an anode connected to the DC power supply line LL and a cathode connected between the capacitor C1 and a series body of the clamp diode D1 and the resistor R1.

According to the above-mentioned clamp circuit 5, the capacitors C1 and C2 are charged through a path in which those are connected in series with each other, whereas the capacitors C1 and C2 are discharged through a path in which those are connected in parallel with each other, with the result that merely a small breakdown voltage is required for those capacitors (see Japanese Patent No. 4049189). Further, as already described in Japanese Patent No. 4049189, the clamp circuit 5 performs charging/discharging operation in accordance with the power factor of the load 7 (hereinafter, referred to as "load power factor"). This enables to suppress an increase of the clamp voltage (voltage across a pair of capacitors C1 and C2) of the clamp circuit 5 in the range where the load power factor is small. Moreover, the resistor R1 is not provided in the discharge path of the capacitors C1 and C2, which avoids power consumption by the resistor R1 in discharging of the capacitors C1 and C2.

Also in the clamp circuit 5 described above, the current flowing into the capacitors C1 and C2 can be reduced in the case where the voltage fed to the converter 4 increases unintentionally, similarly to the clamp circuit 5 of FIG. 1.

Second Embodiment

It is aimed in a second embodiment to suppress an inrush current flowing into the capacitor C1 upon activation of the direct AC power converter. In addition, the current flowing into the capacitor is suppressed with a small resistance in a normal operation after activation.

In a direct power converter illustrated in FIG. 14, differently from the structure of FIG. 1, a current-limiting resistor group 8 is also provided on the input side of the converter 4. The current-limiting resistor group 8 is provided between, for example, the input ends Pr, Ps and Pt and the reactor group 2 and includes resistors R81 and R82 and switches S81 and S82. The resistors R81 and R82 are provided between, for example, the input ends Pr and Pt and the converter 4 (more specifically, for example, reactor group 2), respectively. The resistors R81 and R82 have resistance values larger than the resistance value of the resistor R1, and the resistors R81 and R82 function as so-called current-limiting resistors. For example, in charging of the capacitor C1 that is not initially charged with voltage upon activation of a direct AC power converter, the resistors R81 and R82 are provided for suppressing the inrush current into the capacitor C1.

It is assumed here that upon activation, the converter 4 applies DC voltage to the capacitor C1 with the use of the all phase voltages applied to the input ends Pr, Ps and Pt, to thereby charge the capacitor C1. For example, upon activation, the switching devices of the converter 4 are all rendered conductive to allow the converter 4 to function as a diode bridge. In such an operation, at least any one of the resistors R81 and R82 is present in any of the DC loops linking the capacitor C1 and the input ends Pr, Ps and Pt. This suppresses the inrush current into the capacitor C1. It suffices that the resistors R81 and R82 are provided to any two of the input ends Pr, Ps and Pt, or that three resistors are respectively provided to the input ends Pr, Ps and Pt.

The switches S81 an S82 are connected in parallel with the resistors R81 and R82, respectively. The switches S81 and S82 are opened upon, for example, activation and cause the resistors R81 and R82 to function in charging of the capacitor C1. That is, a charge current flows into the capacitor C1 via the resistors R81 and R82. Meanwhile, when the capacitor C1 is charged with a sufficient voltage after activation, the switches S81 and S82 are closed and stop the functions of the resistors R81 and R82. That is, a current does not flow through the resistors R81 and R82 in a normal operation of a direct AC power converter after activation. Therefore, it is possible to avoid power consumption by the resistors R81 and R82 in a normal operation.

Alternatively, as already described in Japanese Patent Application Laid-Open No. 2009-95149, the converter 4 may charge the capacitor C1 with the use of only the phase voltages applied to any two of the input ends Pr, Ps and Pt upon, for example, activation. For example, the switching devices Trp and Tsn are rendered conductive when the line voltage of the input ends Pr and Ps (difference between the phase voltage of the input end Pr and the phase voltage of the input end Ps) is positive, whereas the switching devices Trn and Tsp are rendered conductive when the line voltage between the input ends Pr and Ps is negative. In this case, a current flows only through the straight path linking the input ends Pr and Ps and the capacitor C1, and thus the resistor R81 and the switch S81 are merely required to be provided to any one of the two input ends Pr and Ps, and the resistor R82 and the switch S82 are not required to be provided.

Still alternatively, for example, the mode shown in FIG. 15 may be sufficient. In the illustration of FIG. 15, the capacitor C1 is divided into two capacitors C1 and C2 connected in series. The power source has a neutral point, and the neutral point is connected to an input end Pn. The current-limiting resistor group 8 includes the resistor R81 and the switch S81 connected in series with each other between the input end Pn and the capacitors C1 and C2.

Upon activation, the switch S81 is closed, and the converter 4 applies a DC voltage obtained by voltage doubler rectification of a phase voltage to each of the capacitors C1 and C2 with the use of the voltages applied to the input end Pn and at least any one of the input ends Pr, Ps and Pt. In this voltage doubler rectification, the resistor R81 is provided in any of the paths of the currents flowing into the capacitors C1 and C2. This suppresses the inrush currents respectively flowing into the capacitors C1 and C2. Then, the switch S81 is opened after activation, and a current does not flow through the resistor R81 in a normal operation.

It is regarded that any of the above-mentioned resistors R81 and R82 is provided in the path linking at least any one of the input ends and the capacitor C1 (or capacitors C1 and C2). Further, it is regarded that the above-mentioned switches S81 and S82 select conduction/non-conduction between the input ends and the capacitor C1 via the resistors R81 and R82, respectively.

In the first embodiment, the current-limiting resistor group 8 is not provided. However, even in the first embodiment, a problem of inrush current does not occur in the following case. For example, in a case where an electrostatic capacitance of the capacitor C1 is small, a problem of inrush current does not occur because the current flowing into the capacitor C1 upon activation is small. The capacitor C1 requires a sufficient electrostatic capacitance for absorbing the inductive energy from the load 7 when, for example, the switching devices of the inverter 6 are all turned off. More specifically, the electrostatic capacitance of the capacitor C1 is set such that the voltage across the capacitor C1 after the capacitor C1 absorbs the regenerative current from the load 7 is equal to or smaller than, for example, the breakdown voltage of the inverter 6. Accordingly, in a case of a small inductance component of the load 7, the inductive energy of the load 7 is small, whereby the capacitor C1 requires merely a small electrostatic capacitance. Therefore, the current-limiting resistor group 8 is not required in this case.

Next, the resistance value of the current-limiting resistor upon activation and the resistance value of the resistor R1 according to the first embodiment are considered. The resistance value of the current-limiting resistor is a sum of the resistance value of the resistor R1 and the resistance value of the resistor R81 or the resistor R82. This is because in charging of the capacitor C1 upon activation, the resistors R81 and R1 or the resistors R82 and R1 are provided in the path of the current flowing into the capacitor C1.

The capacitor C1 is not charged with voltage upon activation, and accordingly not the difference $\Delta E$ described in the first embodiment but the largest value of the line voltage is regarded as the power supply voltage. The largest value of the largest line voltage E1, which increases by approximately 10% due to instantaneous voltage fluctuations when power source is provided, may be fed to the converter 4. This increase arises from the resonant circuit composed of the reactor group 2 and the capacitor group 3. Thus, the power supply voltage is considered to include such an increase amount.

The largest value of the largest line voltage E1 is 645 ($=\sqrt{2} \times 456$) V, and thus the resistance value of the current-limiting resistor needs to be approximately equal to or larger than 20Ω ($=645\text{V} \times 1.1/35$ A) for setting the inrush current idc to, for example, 35 A or smaller.

Meanwhile, as is understood from FIG. 8, it suffices that the resistance value of the resistor R1 is set to 2Ω or larger for setting the largest value of the current idc to 35 A or smaller. This is one-tenth of the resistance value of the current-limiting resistor described above.

As described above, even if the resistance value of the resistor R1 is set to a value smaller than the resistance values of the resistors R81 and R82 (for example, around one-tenth), it is possible to sufficiently suppress the current ic1 flowing into the capacitor C1 in a normal operation. Further, the resistance value of the resistor R1 is made smaller than the resistance values of the resistors R81 and R82, leading to reductions of a circuit size and a manufacturing cost.

The clamp circuit 15 of FIG. 13 may be applied also in the second embodiment. Further, the other embodiments described below are applicable to the first and second embodiments.

Third Embodiment

The third embodiment is different from the first embodiment in the configuration of the clamp circuit. FIG. 16 shows a conceptual configuration of a direct AC power converter according to the third embodiment. The direct AC power converter is identical to that of FIG. 14 except for the clamp circuit 5. Differently from the clamp circuit 5 of FIG. 14, the clamp circuit 5 further includes a switch S1. Note that the current-limiting resistor group 8 is not an essential element.

The switch S1 is connected in parallel with the resistor R1. In the illustration of FIG. 16, the switch S1 is an IGBT and has a collector disposed toward the DC power supply line LH and an emitter disposed toward the DC power supply line LL.

Conduction/non-conduction of the switch S1 is controlled by, for example, a control section 9. The control section 9 outputs switch signals to the converter 4 and the inverter 6 in accordance with the control described in the first embodiment. A more specific functional block for executing the control described in the first embodiment is described in the fourth embodiment.

According to the above-mentioned direct AC power converter, the inverter 6 is stopped and the switch S1 is rendered conductive upon the current that flows into the load 7 exceeding a predetermined over-current set value. For example, when the control section 9 detects the current flowing into the load 7 and judges that this reaches a predetermined over-current set value, the inverter 6 is stopped and the switch S1 is rendered conductive.

As a result, the regenerative current ic1 flowing from the load 7 to the capacitor C1 avoids the resistor R1. Therefore, it is possible to avoid an increase of the DC link voltage Vdc due to the voltage drop Vr1 of the resistor R1 when the inverter 6 is stopped. In other words, an upper limit of the resistance value of the resistor R1, which has been described in the first embodiment, can be eliminated, resulting in an increase of the resistance value of the resistor R1 for reducing the current idc1 flowing from the converter 4 to the capacitor C1 due to, for example, an instantaneous voltage drop or a parasitic inductance.

It is desired to render the switch S1 conductive prior to causing the inverter 6 to stop. This is because the inverter 6 stops after the switch S1 is rendered conductive, and accordingly the regenerative current ic1 avoids the resistor R1 more reliably. The above is realized by, for example, employing a value lower than the over-current set value that serves as a reference for stopping the inverter 6 as a reference value for rendering the switch S1 conductive.

FIG. 17 is a diagram showing another example of the clamp circuit 5. Differently from the clamp circuit 5 of FIG. 13, the switch S1 is included. The switch S1 functions and acts identically to the switch S1 of FIG. 16, and detailed description thereof is omitted.

Fourth Embodiment

In the direct AC power converter including the clamp circuit 5 shown in FIG. 13, the capacitors C1 and C2 are charged/discharged based on the load power factor of the load 7.

As described in Japanese Patent No. 3806872, the power factor decreases in a case where errors in estimation of a rotating position of a rotary machine are reduced by providing a lagging phase. FIG. 18 is a graph showing the relationship between the clamp voltage (sum of the voltages across the capacitors C1 and C2) supported by the clamp circuit 5 and the load power factor. Note that the power supply voltage is set to 415 V (error of ±10%). A horizontal axis represents the load phase angle that is an arctangent of the load power factor. In the clamp circuit 5, the capacitors C1 and C2 are connected in series with each other when those are charged and are connected in parallel with each other when those are discharged, whereby the clamp voltages are represented by two graphs.

The load power factor of 0.5 or larger allows the clamp voltage in charging to be equal to or smaller than the crest value of the line voltage, $415 \times \sqrt{3} \times \sqrt{2} = 1,000$ (V) (the clamp voltage in discharging takes the crest value of the power supply voltage or smaller).

However, when the load power factor decreases considerably to 0.2, the regenerative current is identical to the current in power running, which increases the charge current to the clamp circuit 5. As a result, the clamp voltage in discharging reaches 650 V which is close to the crest value of the power supply voltage. Such an increase of clamp voltage is not desirable, and a reduction thereof is desired.

Therefore, the present application proposes that the clamp circuit 5 is caused to function as a smoothing circuit in a case of a small load power factor.

<Clamp Circuit>

Figure 19:
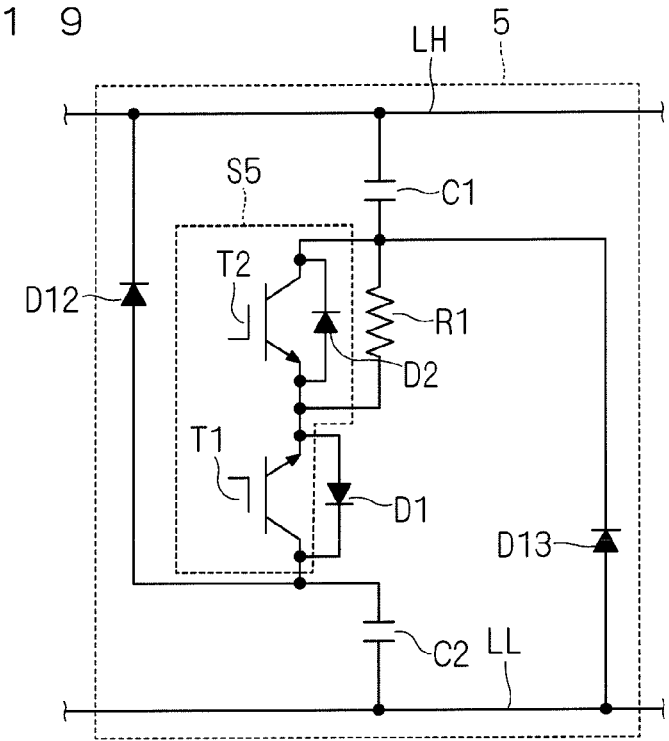
FIG. 19 is a configuration diagram conceptually illustrating a clamp circuit according to a fourth embodiment.

FIG. 19 shows an example of a conceptual configuration of the clamp circuit 5. The clamp circuit 5 further includes a switch section S5, differently from the clamp circuit 5 of FIG. 13. The switch section S5 switches between a smoothing circuit state in which the capacitors C1 and C2 are bi-directionally rendered conductive through the DC power supply lines LH and LL without involving the resistor R1 and the clamp circuit state in which the capacitors C1 and C2 function as clamp circuits via the resistor R1.

That is, the switch section S5 is merely required to be a bidirectional switch connected in parallel with the resistor R1 and the clamp diode D1. In a case where the switch section S5 is composed of a transistor and a diode, it suffices that the clamp diode D1 is caused to function as a part of the switch section S5 as well. This is because a bidirectional switch can be formed with the reduced number of diodes.

For example, the switch section S5 includes transistors T1 and T2 and a diode D2. The transistor T1 is connected in parallel with the diode D1. The transistor T1 is, for example, an IGBT and has an emitter disposed toward the DC power supply line LL and a collector disposed toward the DC power supply line LH.

The transistor T2 is connected in parallel with the resistor R1. The transistor T2 is, for example, an IGBT and has an emitter disposed toward the DC power supply line LH and a collector disposed toward the DC power supply line LL. The diode D2 is connected in parallel with the resistor R with an anode thereof directed toward the DC power supply line LL and a cathode thereof directed toward the DC power supply line LH.

The portion composed of the transistors T1 and T2, the clamp diode D1 and the diode D2 is also regarded as a bidirectional switch.

The clamp circuit 5 functions as the clamp circuit 5 of FIG. 13 in an equivalent manner by rendering both of the transistors T1 and T2 non-conductive. Meanwhile, the clamp circuit 5 functions as a smoothing circuit including only the capacitors C1 and C2 connected in series in an equivalent manner by rendering both of the transistors T1 and T2 conductive. Accordingly, for example, in a case of a small load power factor, the clamp circuit 5 is allowed to function as a smoothing circuit by rendering both of the transistors T1 and T2 conductive. The clamp circuit 5 is allowed to function as a smoothing circuit, whereby the energy regenerated from the load 7 to the capacitors C1 and C2 is supplied to the load 7 again, which does not increase the voltages across the capacitors C1 and C2. As described above, an increase of voltages across the capacitors C1 and C2 (clamp voltage) can be avoided when the load power factor falls below a predetermined value.

Further, as described in the third embodiment, the transistor T2 may be rendered conductive upon the current that flows into the load 7 reaching an over-current set value. As a result, the resistor R1 is short-circuited and the regenerative current is allowed to flow into the capacitors C1 and C2, which suppresses an increase of the DC link voltage Vdc as in the third embodiment. This point is similar in the other clamp circuit 5 described below.

Figure 20:
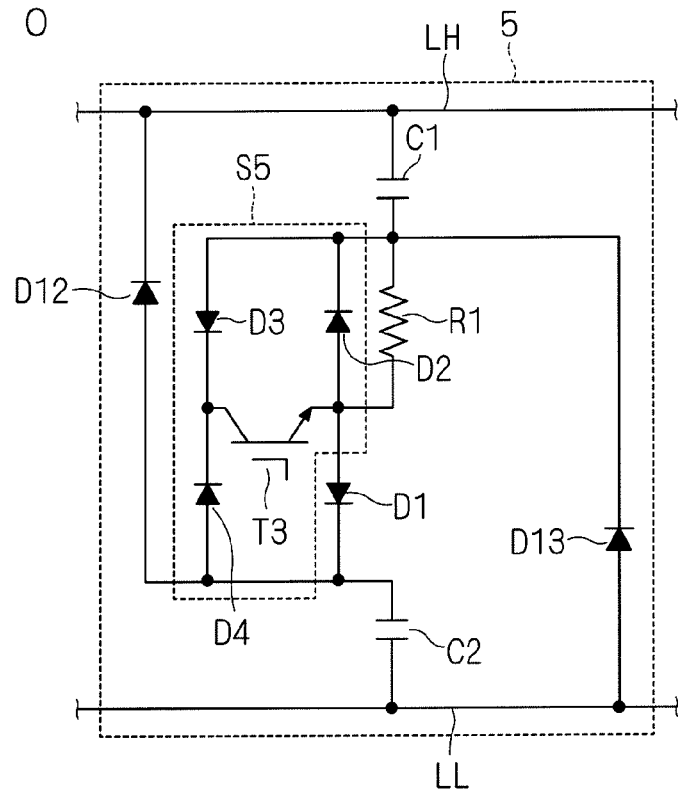
FIG. 20 is a configuration diagram conceptually illustrating another clamp circuit according to the fourth embodiment.

FIG. 20 shows another example of a conceptual configuration of the clamp circuit 5. Differently from the clamp circuit 5 shown in FIG. 19, the configuration of the switch section S5 is different.

The switch section S5 includes a transistor T3 and diodes D2 to D4. The diode D2 is connected in parallel with the resistor R1 with an anode thereof directed toward the DC power supply line LL and a cathode thereof directed toward the DC power supply line LH. The diode D3 has an anode connected to the cathode of the diode D2, and the diode D4 has an anode connected to the cathode of the clamp diode D1. A cathode of the diode D3 and a cathode of the diode D4 are connected to each other.

The transistor T3 is, for example, an IGBT. A collector of the transistor T3 is connected to the cathode of the diode D3 and the cathode of the diode D4. An emitter of the transistor T3 is connected to the anode of the diode D2 and the anode of the diode D1.

The above-mentioned switch section S5 allows the clamp circuit 5 to function as a smoothing circuit upon rendering the transistor T3 conductive and exert a function inherent in a clamp circuit upon rendering the transistor T3 non-conductive. Therefore, increases of the voltages across the capacitors C1 and C2 can be avoided by rendering the switch section S5 conductive when the load power factor falls below a predetermined value. Further, the required number of transistors is fewer compared with the switch section S5 shown in FIG. 19, leading to a manufacturing cost reduction.

According to the above-mentioned clamp circuit 5, though increases of voltages across the capacitors C1 and C2 can be suppressed in a case of a small load power factor, in the case where the clamp circuit 5 functions as a smoothing circuit, it is difficult to output a current even when the converter 4 performs commutation in the first commutation mode. This is because the voltage (clamp voltage) supported by a pair of capacitors C1 and C2 is larger than the middle line voltage E2 output from the converter 4. Therefore, the technique of avoiding a malfunction of an output from the converter 4 in the first commutation mode is proposed as well. Specifically, the converter 4 is operated in a commutation mode different from the first commutation mode.

<Second Commutation Mode>

As in the first commutation mode, in a second commutation mode, commutation is determined in accordance with results of comparison between a carrier and three trapezoidal waves which have a 360-degree cycle and whose phases are shifted from each other by 120 degrees. In the second commutation mode, each of the trapezoidal waves has a pair of flat sections that continue for 180 degrees, which is substantially a rectangular wave. Generally, the concept of "trapezoidal" includes "rectangular", and accordingly in the present application, a rectangular wave used in the second commutation mode in comparison with a carrier is also referred to as a trapezoidal wave, similarly to the trapezoidal wave compared with a carrier in the first commutation mode.

A trapezoidal wave compared with the carrier in the second commutation mode is substantially a rectangular wave, and thus the period in which the trapezoidal wave changes between a pair of flat sections is extremely short.

FIG. 21 is a graph illustrating the trapezoidal waves. In FIG. 21, a horizontal axis is taken as in FIG. 2, where the phase voltage vectors V4, V6, V2, V3, V1 and V5 are shown. Only switching corresponding to the phase voltage vector V4 is performed at the phase angle of 0 to 30 degrees, and only switching corresponding to the phase voltage vector V6 is performed at the phase angle of 30 degrees to 90 degrees.

Accordingly, values employed at the phase angle of 0 to 30 degrees as the line voltage commands Vrs*, Vst* and Vtr* obtained from the phase voltage commands Vr*, Vs* and Vt* in the second commutation mode are values employed at the phase angle of 0 degrees in FIG. 2. Further, the value employed at the phase angle of 30 to 90 degrees is the value employed at the phase angle of 60 degrees in FIG. 2. In this manner, the line voltage commands Vrs*, Vst* and Vtr* have rectangular waves as shown in the graph of FIG. 22.

Therefore, the value compared with the carrier by the current-source converter is dst=0 at the phase angle of 0 to 30 degrees and drt=0 at the phase angle of 30 to 90 degrees.

Though detailed description is omitted, the phase voltage of the middle phase is not applied to the DC link in the second commutation mode, and thus ripple of an average value of the DC link voltage becomes the ripple of a difference between a largest phase voltage and a smallest phase voltage. Therefore, this ripple has the magnitude opposite to that of the first commutation mode. Further, three-phase equilibrium is achieved by correction of an amplitude thereof, and thus amplitude modulation correction may be performed on the line voltage command. FIG. 23 is a graph illustrating a correction value for performing such amplitude modulation correction. Such correction is illustrated in, for example, Japanese Patent No. 2524771.

Figure 24:
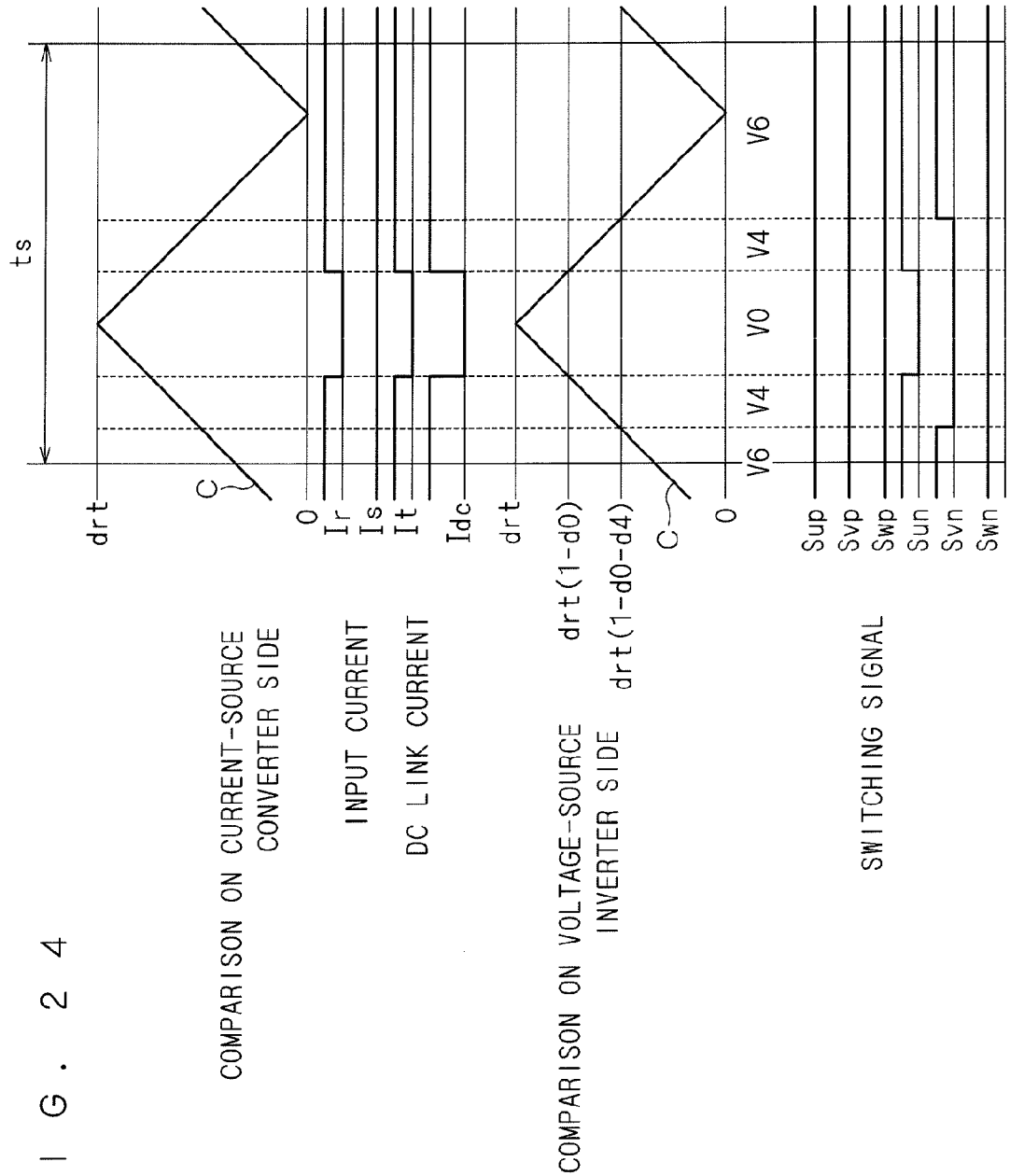
FIG. 24 is a graph describing operations of a converter and an inverter in the second commutation mode.
Figure 25:
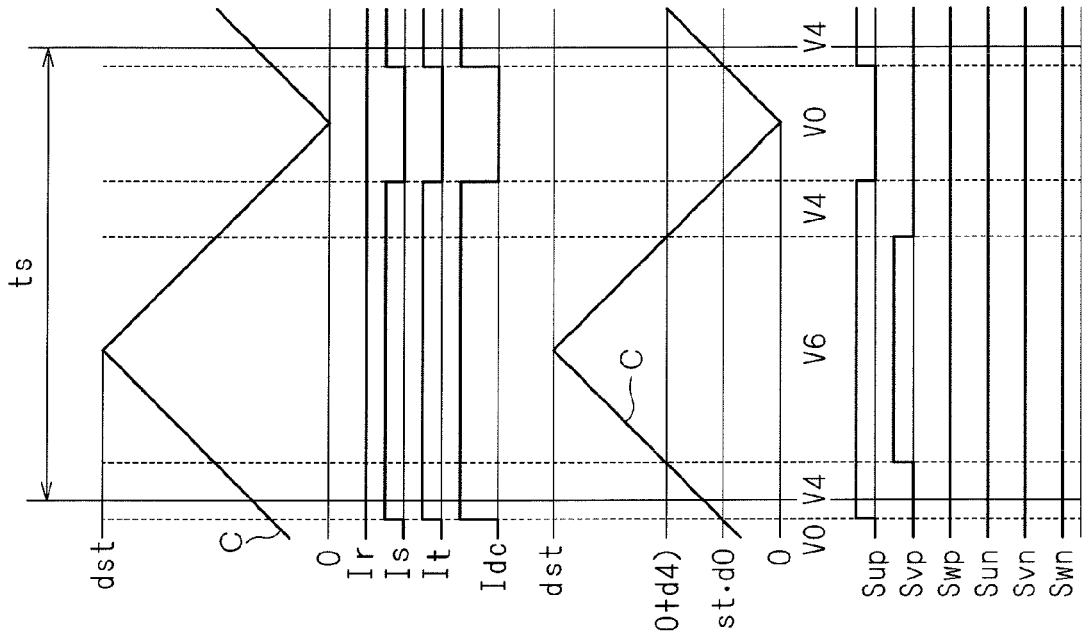
FIG. 25 is another graph describing operations of the converter and the inverter in the second commutation mode.

FIG. 24 and FIG. 25 are graphs describing the operations of the converter 4 and the inverter 6 in the second commutation mode. FIG. 24 and FIG. 25 show the operations of 0 to 30 degrees and the operations at the phase angle of 30 to 90 degrees, respectively, when converted into the phase angles shown in FIG. 21 to FIG. 23.

As described above, the value compared with the carrier C by the converter 4 at the phase angle of 0 to 30 degrees is dst=0, and thus the largest value of the carrier C is represented as drt. In addition, the value compared with the carrier C by the converter 4 at the phase angle of 30 to 90 degrees is drt=0, and thus the largest value of the carrier C is represented as dst. That is, the value drt is employed as a command value by the converter 4 at the phase angle of 0 to 90 degrees in common, which results in that the comparison between the carrier C and the value drt is not required in commutation of the converter 4, so that the input currents Ir=It and Is=0 at the phase angle of 0 to 30 degrees and the input currents Is=It and Ir=0 at the phase angle of 30 to 90 degrees.

Therefore, in the commutation of the inverter 6 side at the phase angle of 0 to 30 degrees (FIG. 24), dst=0 in the comparison of the voltage-source inverter in the first commutation mode (see FIG. 10), where it suffices that the voltage vector V0 is employed during the period in which the carrier C takes the value drt(1−d0) to drt, the voltage vector V4 is employed during the period in which the carrier C takes the value drt(1−d0−d4) to drt(1−d0), and the voltage vector V6 is employed during the period in which the carrier C takes the value 0 to drt(1−d0−d4).

In other words, the conduction patterns of the second switching device group may be switched upon the carrier C taking the value drt(1−d0−d4) or drt(1−d0).

In a similar manner, in the commutation of the inverter 6 side at the phase angle of 30 to 90 degrees (FIG. 25), drt=0 in the comparison of the voltage-source inverter in the first commutation mode (see FIG. 10), where it suffices that the voltage vector V0 is employed during the period in which the carrier C takes the value 0 to dst·d0, the voltage vector V4 is employed during the period in which the carrier C takes the value dst·d0 to dst(d0+d4), and the voltage vector V6 is employed during the period in which the carrier C takes the value dst(d0+d4) to dst.

In other words, the conduction patterns of the second switching device group may be switched upon the carrier C taking the value dst·d0 or dst(d0+d4).

The case where the voltage vector V0 is employed is also illustrated here as in the first commutation mode, and thus the DC link current Idc is zero during the period in which the voltage vector V0 is employed. Along with this, the input currents Ir, Is and It are zero independently of commutation of the converter 4.

In addition, the case where commutation of the inverter 6 is repeated by employing the voltage vectors V0, V4 and V6 is illustrated, and thus in FIG. 24, the switching devices Tup, Tvp and Twp are always non-conductive and the switching device Twn is always conductive. Accordingly, the switching signals Sup, Svp and Swp and the switching signal Swn are shown as deactivation and activation, respectively. Further, in FIG. 25, the switching devices Tun, Tvn and Twp are always non-conductive and the switching device Twn is always conductive, and accordingly the switching signals Sun, Svn and Swp and the switching signal Swn are shown as deactivation and activation, respectively.

(Natural Commutation Mode)

The natural commutation mode is the mode in which rectification is performed only by the first diode group without performing comparison with the carrier as a result of the fact that the first switching device group is all rendered conductive.

As is apparent from the description above, the result is that commutation of the converter 4 in the second commutation mode is not dependent on the operation of the first switching device group. Specifically, the line voltage commands Vrs*, Vst* and Vtr* shown in FIG. 22 that are equivalent to the line current commands of the converter 4 have a rectangular wave of a pattern that is commonly referred to as 120-degree conduction. Accordingly, the above mention mode is equivalent to the mode in which the first switching device group is all rendered conductive and rectification is performed only by the first diode group. Accordingly, the natural commutation mode and the second commutation mode are common in 120-degree conduction and are interchangeable with each other. In the present application, the commutation mode of the converter 4 that achieves 120-degree conduction as described above is referred to as a 120-degree conduction mode. Note that control of a power converter by 120-degree conduction is described in Siyoung Kim, Seung-Ki Sul, Thomas A. Lipo, "AC/AC Power Conversion Based on Matrix Converter Topology with Unidirectional Switches", IEEE trans. on Industry Applications, Vol. 36, No. 1, 2000, pp. 139-145 as well.

Similarly to the second commutation mode, as a result, the comparison between the carrier C and the value drt is not required also in commutation of the converter 4 in the natural commutation mode.

Figure 26:
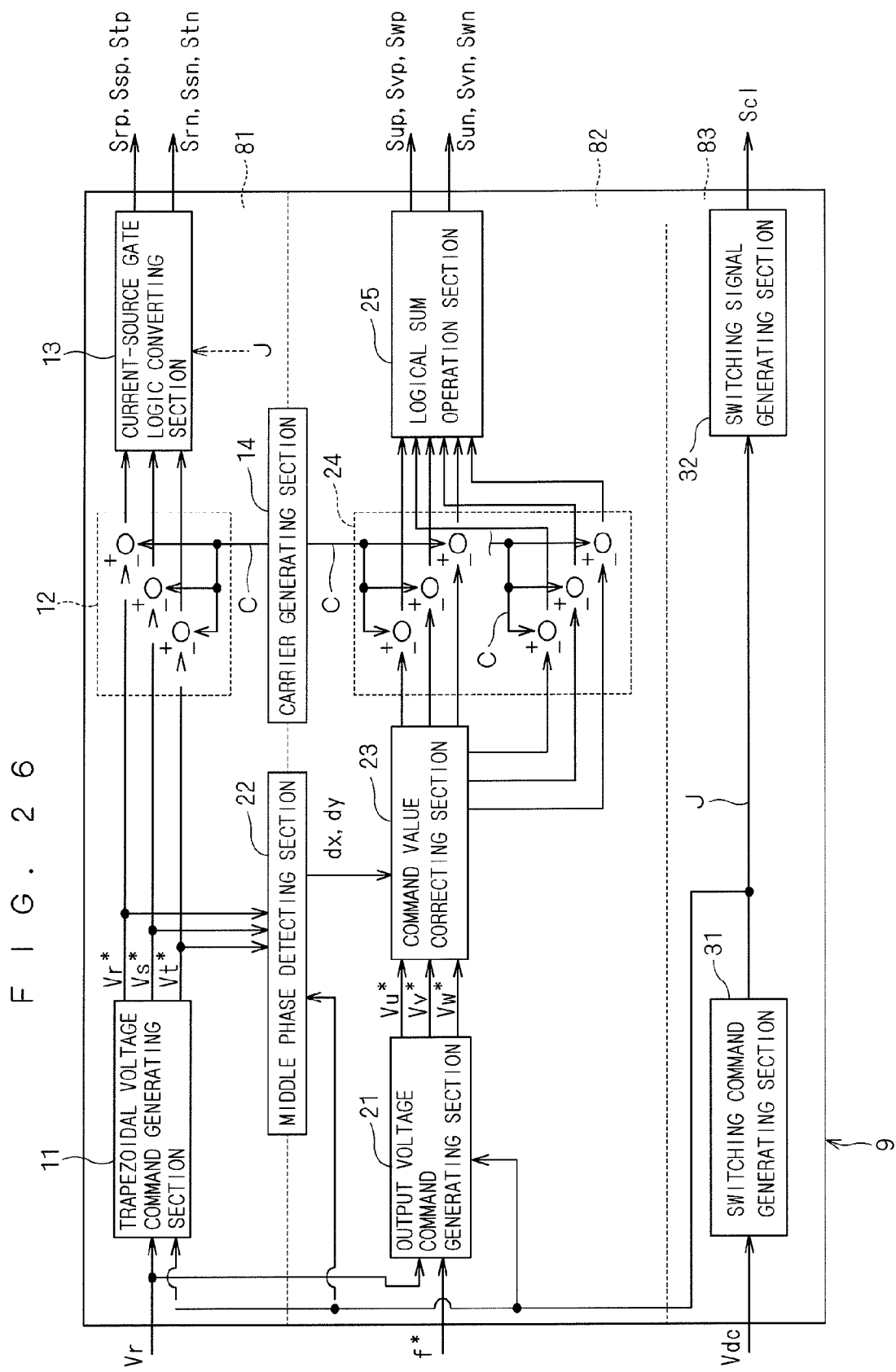
FIG. 26 is a block diagram showing a conceptual example of a control section for performing commutation of a converter and an inverter.

Next, a specific configuration for performing the above-mentioned switching is described by way of example. FIG. 26 is a block diagram showing a conceptual example of the control section 9 for performing commutation of the converter 4 and commutation of the inverter 6. The control section 9 is roughly divided into a converter commutation signal generating section 81, an inverter commutation signal generating section 82 and a switching signal generating section 83.

(Commutation of Converter 4)

The converter commutation signal generating section 81 receives a voltage Vr (in particular, phase thereof) of the input end Pr and outputs switching signals Srp, Ssp, Stp, Sm, Ssn and Stn. The switching devices Trp, Tsp, Ttp, Trn, Tsn and Ttn are rendered conductive/non-conductive by activation/deactivation of the switching signals Srp, Ssp, Stp, Sm, Ssn and Stn, respectively.

The inverter commutation signal generating section 82 receives the voltage Vr (in particular, phase thereof) and a command value f* of an operation frequency and outputs the switching signals Sup, Svp, Swp, Sun, Svn and Swn.

The switching signal generating section 83 generates a switching signal Sc1 based on the DC link voltage Vdc (desirably, an average value obtained by removing fluctuations due to pulse width modulation from the DC link voltage Vdc) that is the voltage between the DC power supply lines LH and LL. The switch section S5 is rendered conductive/non-conductive in accordance with activation/deactivation of the switching signal Sc1, respectively.

The converter commutation signal generating section 81 includes a trapezoidal voltage command generating section 11, a comparator 12 and a current-source gate logic converting section 13. While detailed descriptions thereof are omitted because operations thereof are publicly-known technology in Japanese Patent Application Laid-Open No. 2007-312589 and WO 2007/123118, outlines thereof are as follows.

The trapezoidal voltage command generating section 11 generates the phase voltage commands Vr*, Vs* and Vt* having a trapezoidal wave based on, for example, a predetermined table. For example, a slope area of a trapezoidal wave employed in the first commutation mode is represented by ±√3·tan(θ) by normalizing the amplitude thereof (θ is a phase determined for each phase based on the phase of the phase voltage Vr, which is −π/6≤θ≤π/6). The phase voltage commands Vr*, Vs* and Vt* employed in the second commutation mode have a steep slope in the vicinity of places where values thereof change.

The comparator 12 outputs results of the comparison between the carrier and the phase voltage commands Vr*, Vs* and Vt*, and the current-source gate logic converting section 13 generates the switching signals Srp, Ssp, Stp, Sm, Ssn and Stn based on those results. The generation thereof is described below.

Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106 and 107 above suggests the correspondence relationship between switching based on the line current command value and switching based on the phase current command value in view of the duality of the phase voltage of a voltage-source inverter and the phase current of a current-source inverter and the duality of the line voltage of a voltage-source inverter and the phase current of a current-source inverter.

Figure 27:
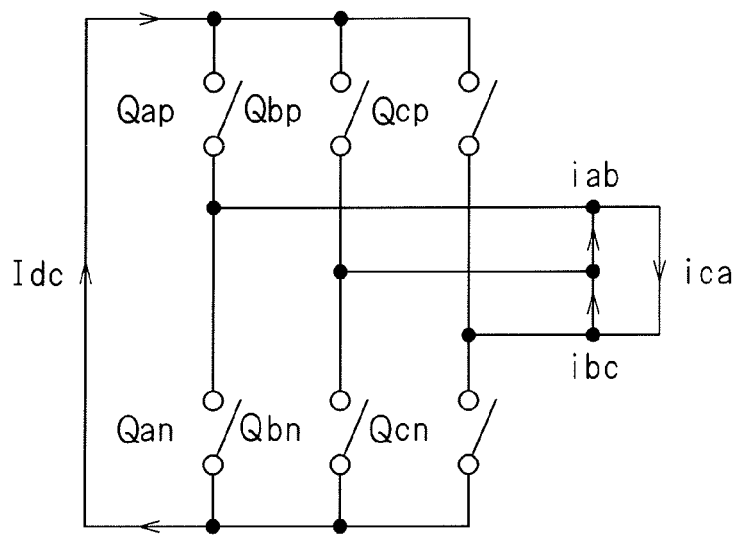
FIG. 27 is a circuit diagram showing a configuration of a virtual inverter.

FIG. 27 is a circuit diagram showing the configuration of a virtual inverter considered here. This inverter is provided for considering switching of the converter 4 and has no direct relevance to the inverter 6, and thus terms of a-phase, b-phase and c-phase are used for three-phase AC. The inverter includes a switch device Qap and a switch device Qan on a high-arm side of the a-phase and a low-arm side thereof, respectively. Similarly, the inverter includes switch devices Qbp and Qbn in the b-phase and switch devices Qcp and Qcn in the c-phase.

A line current of the a-phase is determined by a difference between a phase current ica between the a-phase and the c-phase and a phase current iba between the b-phase and the a-phase, and thus the a-phase current flows only in a case of performing switching for causing the pair of phase currents to flow. The same holds true for line currents of other phases. Therefore, a symbol Sjk represents whether or not a phase current ijk flows through the switch devices on the high-arm side, and a symbol SjkB represents whether or not the phase current ijk flows through the switch devices on the low-arm side. Here, the symbols j and k represent symbols a, b and c though they are different from each other, and whether the phase current ijk "flows"/"does not flow" is indicated by a binary logic "1"/"0" taken by the symbols Sjk and SjkB.

When the inverter causes the line current to flow based on the comparison between a phase voltage command and a carrier, if the switch commands for controlling conduction/non-conduction of the switch device Qjp on the high-arm side and the switch device Qjn on the low-arm side are represented by symbols $Sj^+$ and $Sj^-$, respectively, the descriptions of Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106 and 107 are shown by the following conversion equations: $Sa^+=Sac \cdot SbaB$, $Sb^+=Sba \cdot ScbB$, $Sc^+=Scb \cdot SacB$, $Sa^-=Sba \cdot SacB$, $Sb^-=Scb \cdot SbaB$ and $Sc^-=Sac \cdot ScbB$.

Further, in view of the duality of the phase voltage of a voltage-source inverter and the phase current of a current-source inverter, it is found that logical values of the right sides of the equations above are obtained as results of the comparison between the phase voltage of a voltage-source inverter and a carrier. According to Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106 and 107, a command value of a phase current ijk corresponds to a command value of a phase voltage Vj. Accordingly, the logic of the symbol Sjk coincides with the logic for rendering the switch device Qjp conductive by the comparison between the phase voltage command Vj* and the carrier, and the logic of the symbol SjkB coincides with the logic for rendering the switch device Qjn conductive by the comparison between the phase voltage command Vj* and the carrier.

The logic of the symbol SbaB coincides with the logic for rendering the switch devices Qap and Qbp conductive by the comparison between the phase voltage command Vb and the carrier, and the logic of the symbol Sba coincides with the logic for rendering the switch devices Qbp and Qap conductive by the comparison between the phase voltage command Vb and the carrier. More specifically, the switch device Sap is rendered conductive in a case where the phase voltage command Vb is equal to or smaller than the carrier, and the switch device Qbp is rendered conductive in a case where the phase voltage command Vb is equal to or larger than the carrier. Symbols $Sa^+$ and $Sb^+$ represent the periods in which the switch devices Qap and Qbp are conductive when the line current is caused to flow, respectively.

Description is now given of, by replacing the phase voltage commands Vr*, Vs* and Vt* shown in FIG. 2 by voltage commands Va*, Vb* and Vc, the case where those at phase angle of 0 to 60 degrees. The voltage commands Va* and Vc* take values 1 and −1, respectively, and thus Sac=1, SacB=0, Scb=0 and ScbB=1. Accordingly, $Sa^+=SbaB$, $Sb^+=Sba$ and $Sc^+=Sa^-=Sb^-=0$.

In other words, when the a-phase, b-phase and c-phase are replaced by the r-phase, s-phase and t-phase, respectively, the switch device Qrp is rendered conductive in a case where the phase voltage command Vs* is equal to or smaller than the carrier C, and the switch device Qsp is rendered conductive in a case where the phase voltage command Vs* is equal to or larger than the carrier C. In view of a fact that a smallest value of the carrier C is zero, a value of the voltage command signal Vs corresponds to the period in which the switch device Qrp is conductive.

From the above, the value of the phase voltage command Vs is a reference value drt when a command value to be compared with the carrier C is obtained. This defines the commutation timing when the switch devices Qrp and Qsp of the converter 4 are alternately rendered conductive during periods proportional to a ratio between the values drt and dst. Similarly at other phase angle, the description above holds true for the values of the voltage commands Vr* and Vt*.

Referring back to FIG. 26, the results obtained by the comparison between the carrier C and the phase voltage commands Vr*, Vs* and Vt* determined as described above are provided from the comparator 12 to the current-source gate logic converting section 13. Then, the conversion is performed in accordance with the conversion equations above, whereby the switching signals Srp, Ssp, Stp, Sm, Ssn and Stn are obtained.

The carrier generating section 14 that generates the carrier C may be provided in the converter commutation signal generating section 81 or may be provided in the inverter commutation signal generating section 82 described below. Alternatively, it may be regarded to belong to both of them.

(Commutation of Inverter 6)

The inverter commutation signal generating section 82 includes an output voltage command signal generating section 21, a middle phase detecting section 22, a command value correcting section 23, a comparator 24 and a logical sum operation section 25. The operation of the inverter commutation signal generating section 82 is publicly known by Japanese Patent Application Laid-Open No. 2007-312589 and WO 2007/123118, and hence brief description is given.

The middle phase detecting section 22 judges which of the phase voltage commands Vr*, Vs* and Vt* corresponds to a so-called middle phase. As to the first commutation mode, the phase voltage command Vs* corresponds to the middle phase at the phase angle of 0 to 60 degrees illustrated in FIG. 2. Then, a ratio drt:dst is determined in view of a value of the phase voltage command Vs*, and the values drt and dst are provided to the command value correcting section 23. The ratio therebetween differs according to which phase voltage command corresponds to the middle phase, and thus in FIG. 26, values corresponding to the values drt and dst are shown as correction values dx and dy, respectively, including the case where the phase voltage commands Vr* and Vt* are middle phases. Description is given below in this manner as well.

Note that in a case of employing the second commutation mode or the natural commutation mode, the period in which the middle phase exists is extremely short. Therefore, in actuality, extraction is made as to which of the line voltage commands Vrs*, Vst* and Vtr* uniquely determined from the phase voltage commands Vr*, Vs* and Vt* is a middle phase. For example, the line voltage command Vst* is the middle phase at the phase angle of 0 to 30 degrees, and the value dst is set to zero on this occasion. The line voltage command Vrs* is the middle phase at the phase angle of 30 to 90 degrees, and the value drt is set to zero on this occasion.

The middle phase detecting section 22 may be provided in the inverter commutation signal generating section 82 or may be provided in the converter commutation signal generating section 81 described above. Alternatively, it may be regarded to belong to both of them.

The output voltage command generating section 21 receives the voltage Vr (in particular, phase thereof) and the command value f* of an operation frequency and generates the voltage command values Vu*, Vv* and Vw* of the inverter 6. The generation of the voltage command values Vu*, Vv* and Vw* as described above is a well known technology, and thus description thereof is omitted.

The command value correcting section 23 generates a value to be compared with the carrier C for commutation of the inverter 6 based on the voltage command values Vu*, Vv* and Vw* and the correction values dx and dy. Referring to FIG. 10 (that is, taking a case where the phase voltage command Vs* is the middle phase as an example), the command value correcting section 23 calculates, based on the voltage command values Vu*, Vv* and Vw*, the values d0, d4 and d6 (=1−d0−d4) and generates, based on those and the values drt and dst, values drt(1−d0−d4), drt(1−d0), drt+dst·d0 and drt+dst(d0+d4). In addition, the command value correcting section 23 outputs the values 0 and drt+dst. Those values are compared by the comparator 24, and the results thereof are computed by the logical sum operation section 25. Then, the logical sum operation section 25 generates the switching signals Sup, Svp, Swp, Sun, Svn and Swn based on the comparison results by the comparator 24.

(Switching of Commutation Mode)

The switching signal generating section 83 includes a switching command generating section 31 and a switching signal generating section 32. The switching command generating section 31 judges switching between the first commutation mode and the second commutation mode (or natural commutation mode) based on the DC link voltage Vdc in accordance with the criteria described below, thereby generating a switching command J.

The trapezoidal voltage command generating section 11 switches between types of the trapezoidal waves of the phase voltage commands Vr*, Vs* and Vt* to be output in accordance with the switching command J. Further, in actuality, in detection of the middle phase of the middle phase detecting section 22, the middle phase of the phase voltage commands Vr*, Vs* and Vt* is preferably detected in the first commutation mode and the middle phase of the line voltage commands Vrs*, Vst* and Vtr* is preferably detected in the second commutation mode, as described above. Therefore, the middle phase detecting section 22 may switch between middle phases of the phase voltage command and the line voltage command to be detected in accordance with the switching command J.

Note that in a case where the natural commutation mode is employed in place of the second commutation mode, the first switching device group is all rendered conductive. Accordingly, the converter commutation signal generating section 81, the inverter commutation signal generating section 82 and the switching signal generating section 83 are not required to function as described above in actuality, and the switching signals Srp, Srp, Ssp, Ssn, Ssn and Ssn may by all activated. For example, as indicated by a dashed arrow in FIG. 26, the current-source gate logic converting section 13 is provided with the switching command J. In a case where the switching command J sets the first commutation mode, the current-source gate logic converting section 13 operates as described above. In a case where the switching command J sets the natural commutation mode, the current-source gate logic converting section 13 outputs the switching signals Srp, Sm, Ssp, Ssn, Stp and Stn that have all been activated.

Note that from a standpoint of apparatus design, generating waveforms of the phase voltage commands Vr*, Vs* and Vt* for the second commutation mode is more advantageous than causing the switching signal generating section 83 to perform such a particular operation for the natural commutation mode. That is, the converter 4 performs commutation by the comparison between trapezoidal waves and a carrier in both of the first and second commutation modes, and accordingly design does not need to be made individually in accordance with those commutation modes.

On the other hand, it is not required to make comparison between trapezoidal waves and a carrier when the natural commutation mode is employed for the 120-degree commutation mode.

In a case where the switching command J sets the first commutation mode as the commutation mode of the converter 4, the switching signal generating section 32 deactivates the switching signal Sc1. Further, in a case where the switching command J sets the second commutation mode or the natural commutation mode as the commutation mode of the converter 4, the switching signal generating section 32 activates the switching signal Sc1.

In a case where the first commutation mode is employed and the clamp circuit 5 is caused to function as a smoothing circuit as descried above, it is difficult to output the current even when the converter 4 performs commutation in the first commutation mode.

In contrast, in the second commutation mode or the natural commutation mode, a current flows in the pattern of 120-degree conduction, and thus one to which the phase voltage corresponding to a largest phase among the input ends Pr, Ps and Pt is applied is connected to the DC power supply line LH. Accordingly, a potential can be surely supplied from the converter 4 to the inverter 6. That is, it is possible to avoid a malfunction in the first commutation mode resulting from the regenerative current that increases as the power factor reduces, and hence direct AC power conversion can be achieved.

Accordingly, it is desired to render the switch section S5 conductive and employ the second commutation mode (or natural commutation mode) in a case where the load power factor falls below a predetermined value. More specifically, the second commutation mode or the natural commutation mode is employed upon rendering the switch section S5 conductive in the state in which the first commutation mode is employed. Note that the first commutation mode is employed at and after the time when the switch section S5 is rendered non-conductive.

As is understood from FIG. 18, the load power factor can be estimated by detecting the clamp voltage supported by the capacitor. Alternatively, the load power factor can be estimated by detecting the DC link voltage Vdc because fluctuations in clamp voltage affect the magnitude of the DC link voltage Vdc. Therefore, as shown in FIG. 26, the switching command generating section 31 can generate the switching command J by receiving the DC link voltage Vdc (or clamp voltage), obtaining an average value Vdc1 from this, and comparing the average value Vdc1 with a threshold value corresponding to the predetermined value of the load power factor.

Figure 28:
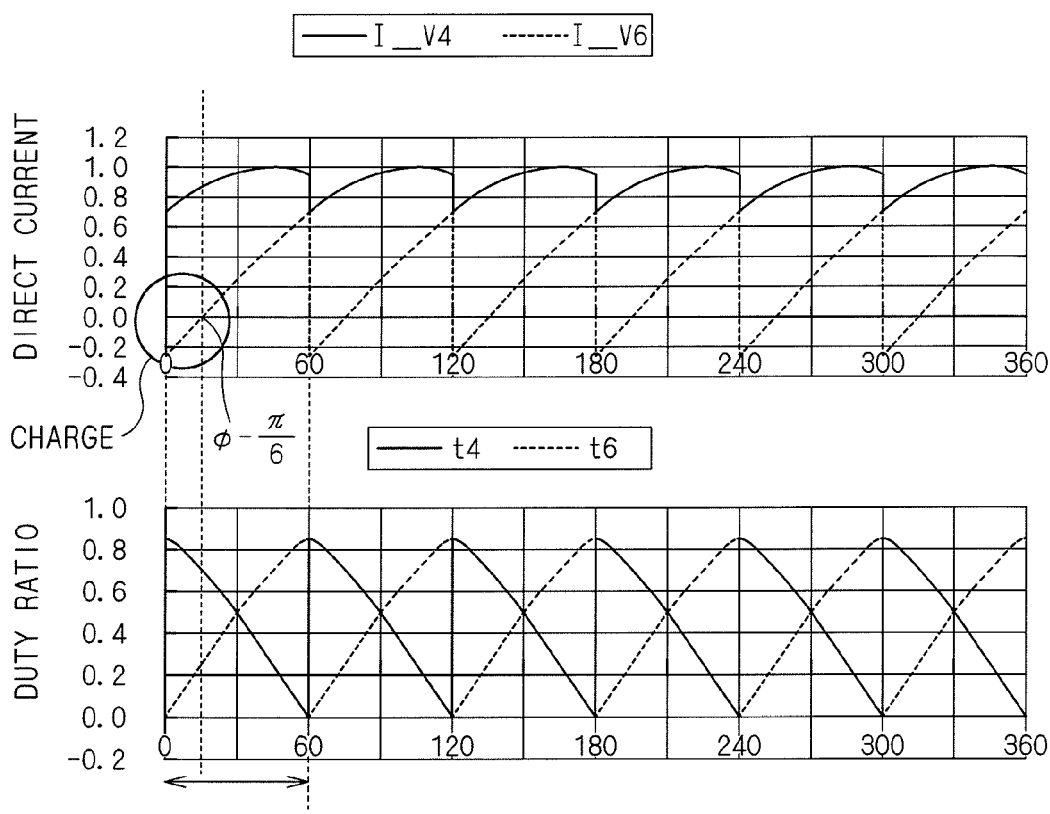
FIG. 28 is a figure showing FIG. 6(d) and (e) of Japanese Patent No. 3772898.

Alternatively, as shown in FIG. 6(d) of Japanese Patent No. 3772898, a phase angle at which the current polarity is reversed delays by π/6 with respect to the current phase angle. As shown in FIG. 6(e) of Japanese Patent No. 3772898, the phase angle of output voltage of the inverter is known, and thus the magnitude of power factor can be estimated based on the phase of a load current that is detected from a difference of those phase angles. That is, it is possible to generate the switching command J by feeding, as an input to the switching command generating section 31, the zero cross of inverter output current and the output voltage of an inverter in place of the DC link voltage Vdc shown in FIG. 26, and comparing a phase difference therebetween with a threshold value corresponding to a predetermined value of the load power factor. FIG. 6 (d) and (e) of Japanese Patent No. 3772898 are shown as FIG. 28. Graphs I_V4 and I_V6 show DC currents flowing when the inverter takes the voltage vectors V4 and V6, respectively, and graphs t4 and t6 show duty ratios when the inverter takes the voltage vectors V4 and V6, respectively.

Still alternatively, in view of the fact that the operation for reducing errors in estimating a rotation position of a rotary machine with a lagging phase is employed at the beginning of activation, it is preferred that the switch section S5 be rendered conductive at the beginning of activation and the second commutation mode or the natural commutation mode is employed at this timing. Then, the converter 4 performs commutation in accordance with the second commutation mode or the natural commutation mode until a lapse of a predetermined period, and the switch section S5 is rendered non-conductive after a lapse of the predetermined period. It suffices that the first commutation mode is employed after this time. In a case where the load 7 is a rotary machine, it is possible to take measures against a reduction in power factor resulting from the current that is to have a lagging phase for detecting a position at the beginning of activation in this manner.

Note that it is possible to use a so-called CD snubber without providing the diodes D12 and D13 in the clamp circuit 5 as described above. FIGS. 29 and 30 show this clamp circuit 5. The clamp circuit 5 of FIGS. 29 and 30 is identical to the clamp circuit 5 of FIGS. 19 and 20 excluding the diodes D12 and D13. In such a case, the clamp circuit 5 is caused to function as a smoothing circuit by rendering the switch section S5 conductive.

In this case, however, the clamp circuit 5 does not function effectively even when the switch section S5 is rendered non-conductive unless the load power factor is $\sqrt{3}/2$ or larger. Therefore, the period in which the switching command J selects the first commutation mode is desired to be delayed until the load power factor becomes $\sqrt{3}/2$ or larger.

(Instantaneous Voltage Drop of Power Source Connected to Input Ends)

When the three-phase AC voltage to be fed to the converter 4 disappears due to an instantaneous blackout, the capacitors C1 and C2 are discharged by being connected in parallel in the clamp circuit 5, whereby the clamp voltage is reduced by one-half. In particular, in a case where the load 7 is a rotary machine, reduced clamp voltage weakens an interlinkage magnetic flux of the rotary machine. Accordingly, there is a fear that the current may increase to stop the inverter 6 or an operation may be stopped due to loss of synchronism.

Figure 31:
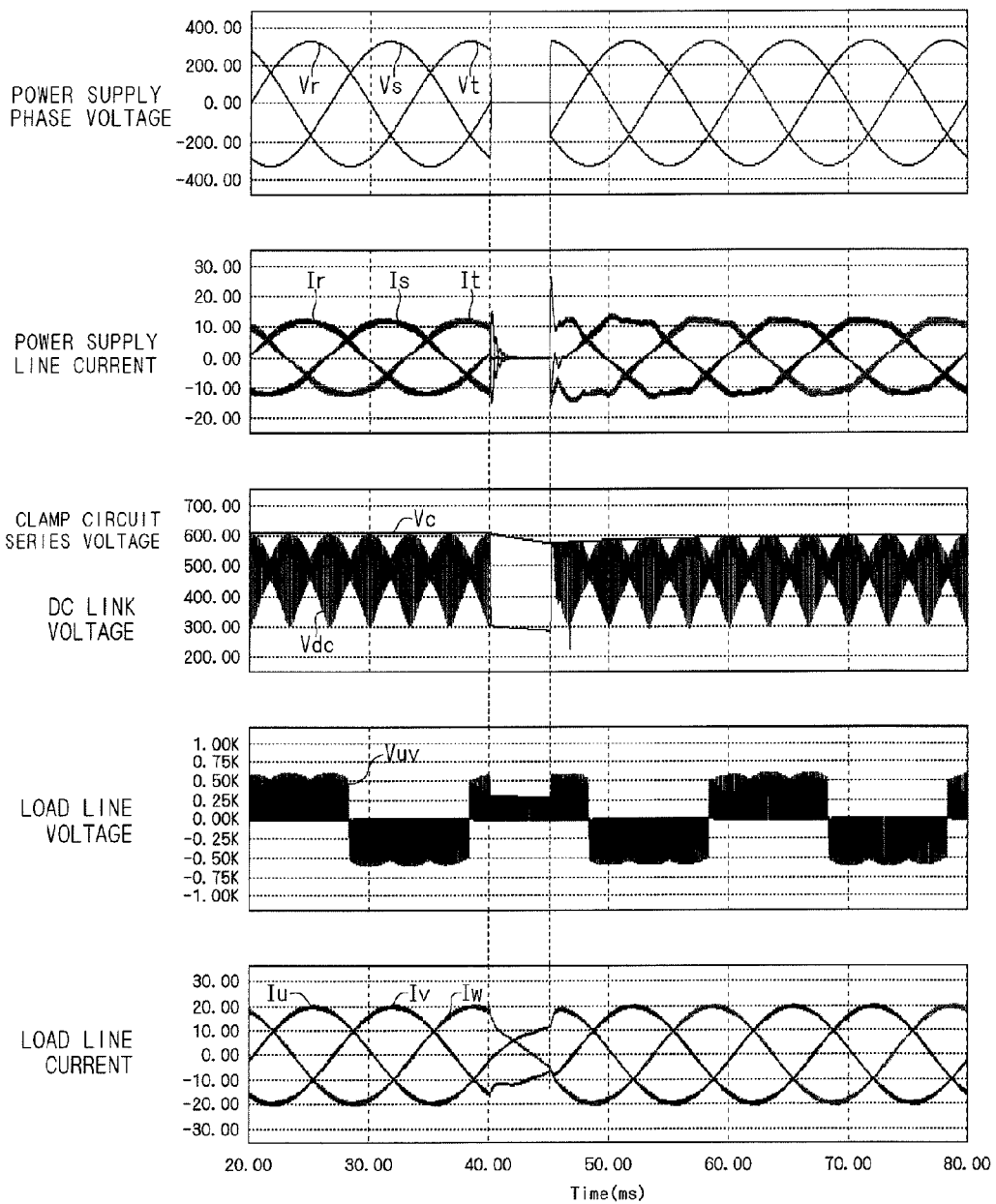
FIG. 31 is a graph showing an operation when the clamp circuit functions even during an instantaneous blackout.

FIG. 31 is a graph showing an operation in a case where the clamp circuit 5 functions even during an instantaneous blackout. The power supply voltage generated by the power source 1 is 50 Hz 400V, and there is illustrated a case where a blackout occurs during only a ¼ cycle.

Phase voltages Vr, Vs and Vt represent the voltages at the input ends Pr, Ps and Pt, respectively, power supply line currents Ir, Is and It represent the currents flowing from the capacitor group 3 into the input ends Ir, Is and It, respectively, a clamp circuit series voltage Vc represents a sum of voltages supported by the capacitors C1 and C2 in the clamp circuit 5, the DC link voltage Vdc represents the voltage between the DC power supply lines LH and LL, the load line voltage represents a difference of the voltages Vu, Vv and Vw applied to the output ends Pu, Pv and Pw (note that a difference Vuv between the voltages Vu and Vv is shown), and load line currents Iu, Iv and Iw represent the currents flowing from the output ends Pu, Pv and Pw to the load 7, respectively.

The phase voltages Vr, Vs and Vt all become zero, and thus the power supply line currents Ir, Is and It converge on zero with ringing. As to the DC link voltage Vdc, the voltages supported by the capacitors C1 and C2 are merely maintained, and accordingly it reduces. Along with this, the load line voltage Vuv also reduces by one-half, whereby the load line currents Iu, Iv and Iw are disturbed considerably.

Then, the switch section S5 is short-circuited upon an instantaneous blackout. Specifically, the switching signal Sc1 is activated upon an average value Vcd1 of the DC link voltage Vdc falling below a first threshold value (for example, 400 V). The generation of the switching command J in this case is described above.

Figure 32:
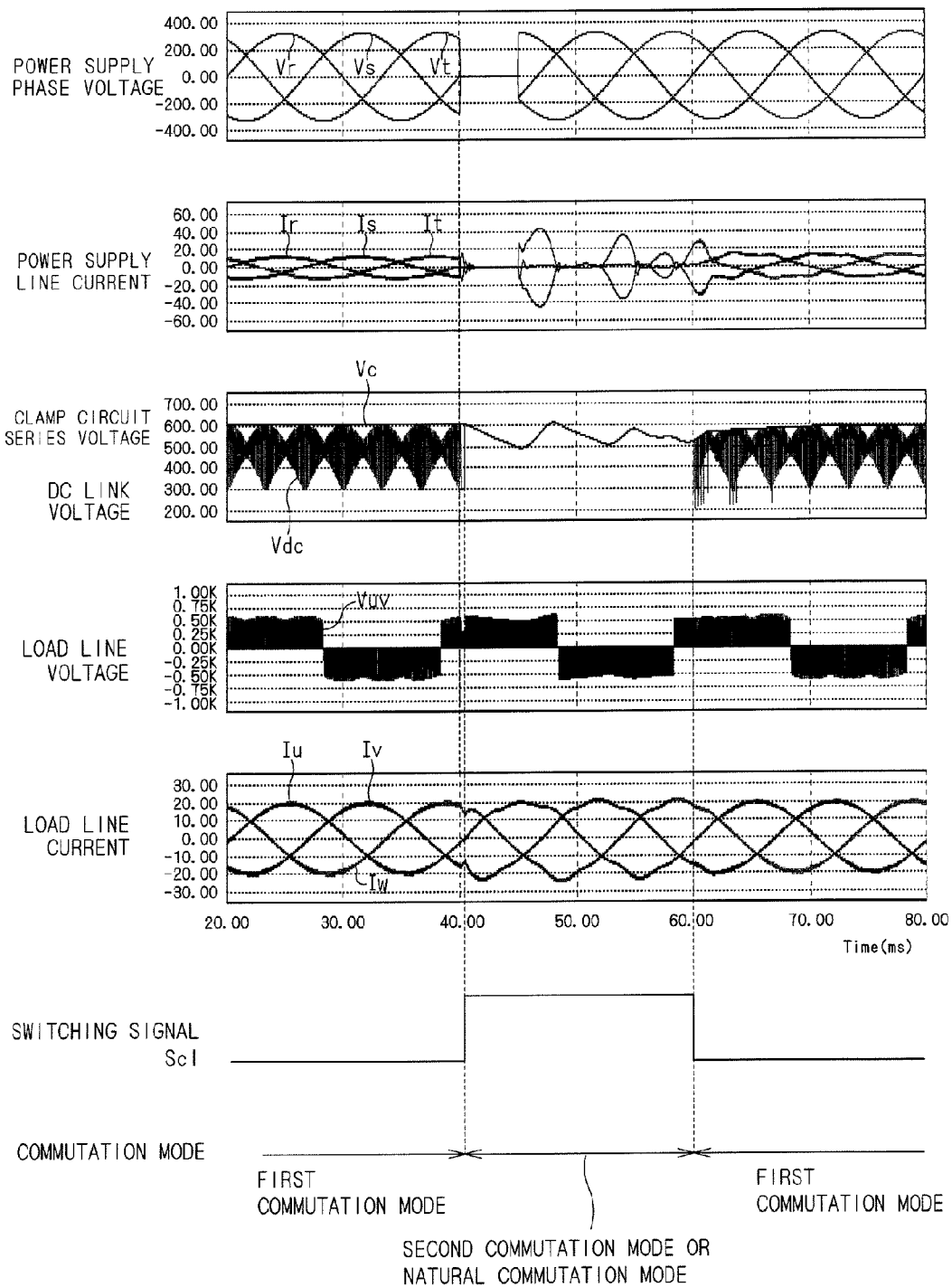
FIG. 32 is a graph showing an operation of switching commutation modes of a converter.
Figure 33:
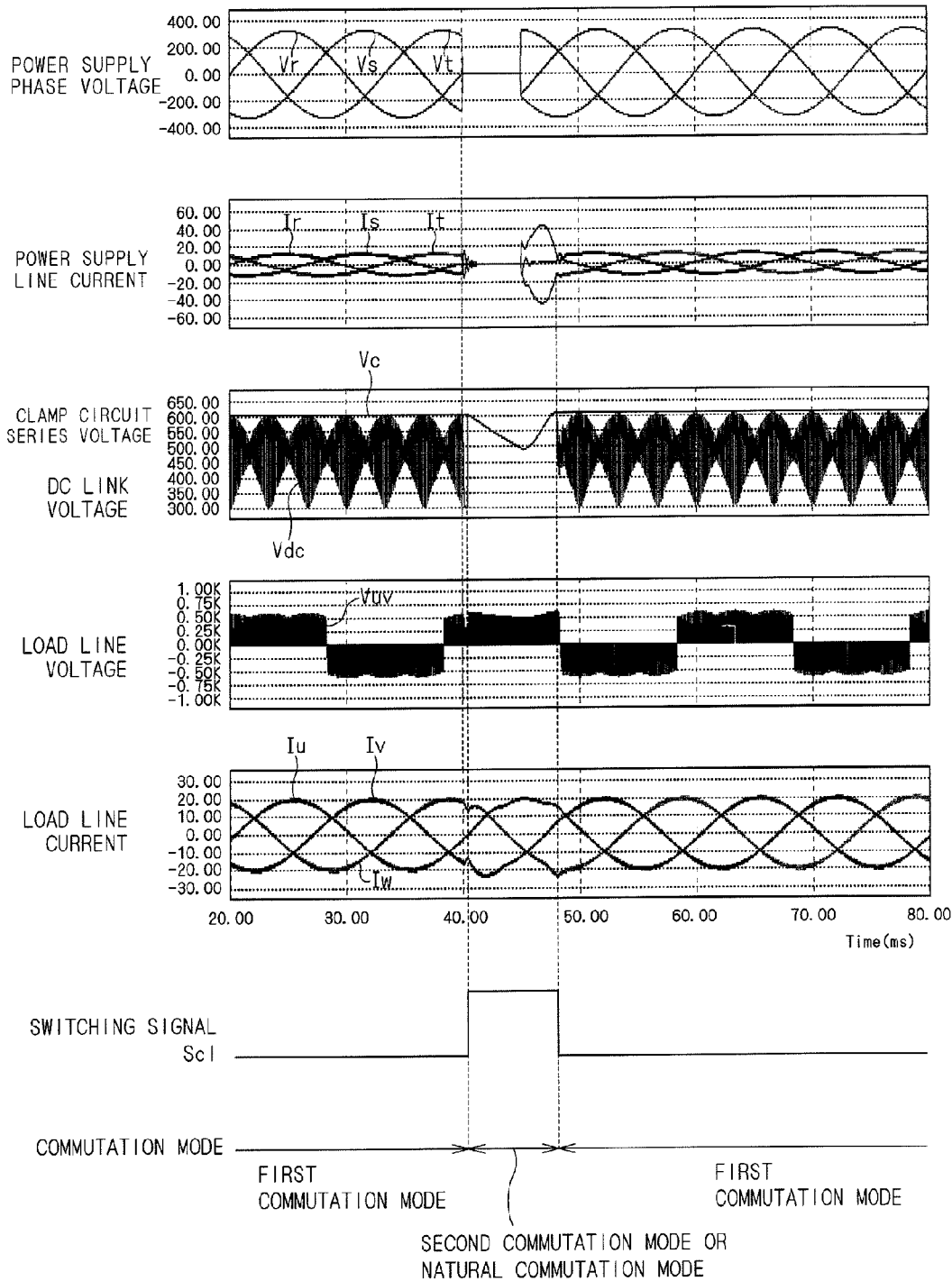
FIG. 33 is a graph showing another operation of switching the commutation modes of the converter.

FIG. 32 and FIG. 33 are graphs showing operations in a case where the switching signal Sc1 is activated as described above and the commutation mode of the converter 4 is set to 120-degree conduction mode (second commutation mode or natural commutation mode) when the switching signal Sc1 is activated and the commutation mode of the converter 4 is set to the first commutation mode when the switching signal Sc1 is deactivated. There is illustrated a case where, similarly to FIG. 31, the power supply voltage generated by the power source 1 is 50 Hz 400V, and a blackout occurs during only a ¼ cycle.

In both of them, the capacitors C1 and C2 are connected in series between the DC power supply lines LH and LL while the switching signal Sc1 is activated, whereby the DC link voltage Vdc coincides with the clamp circuit series voltage Vc.

Further, the converter 4 performs commutation in a 120-degree conduction mode while the switching signal Sc1 is activated, and eventually the clamp voltage Vc (DC link voltage Vdc) rises.

Note that FIG. 32 illustrates a case where the switching signal Sc1 is deactivated when the DC link voltage Vdc keeps a value exceeding a second threshold value (this is equal to or larger than the first threshold value, for example, 450 V) for a predetermined period. FIG. 33 illustrates a case where the switching signal Sc1 is deactivated upon the DC link voltage Vdc exceeding the second threshold value (this is equal to or larger than the first threshold value, for example, 600 V).

The operation shown in FIG. 32 is advantageous in that the DC link voltage Vdc does not excessively increase when shifting to the first commutation mode, and the DC link voltage Vdc is difficult to excessively increase after that. The operation shown in FIG. 33 is advantageous in fewer times when ringing occurs in the power supply line currents Ir, Is and It.

Figure 34:
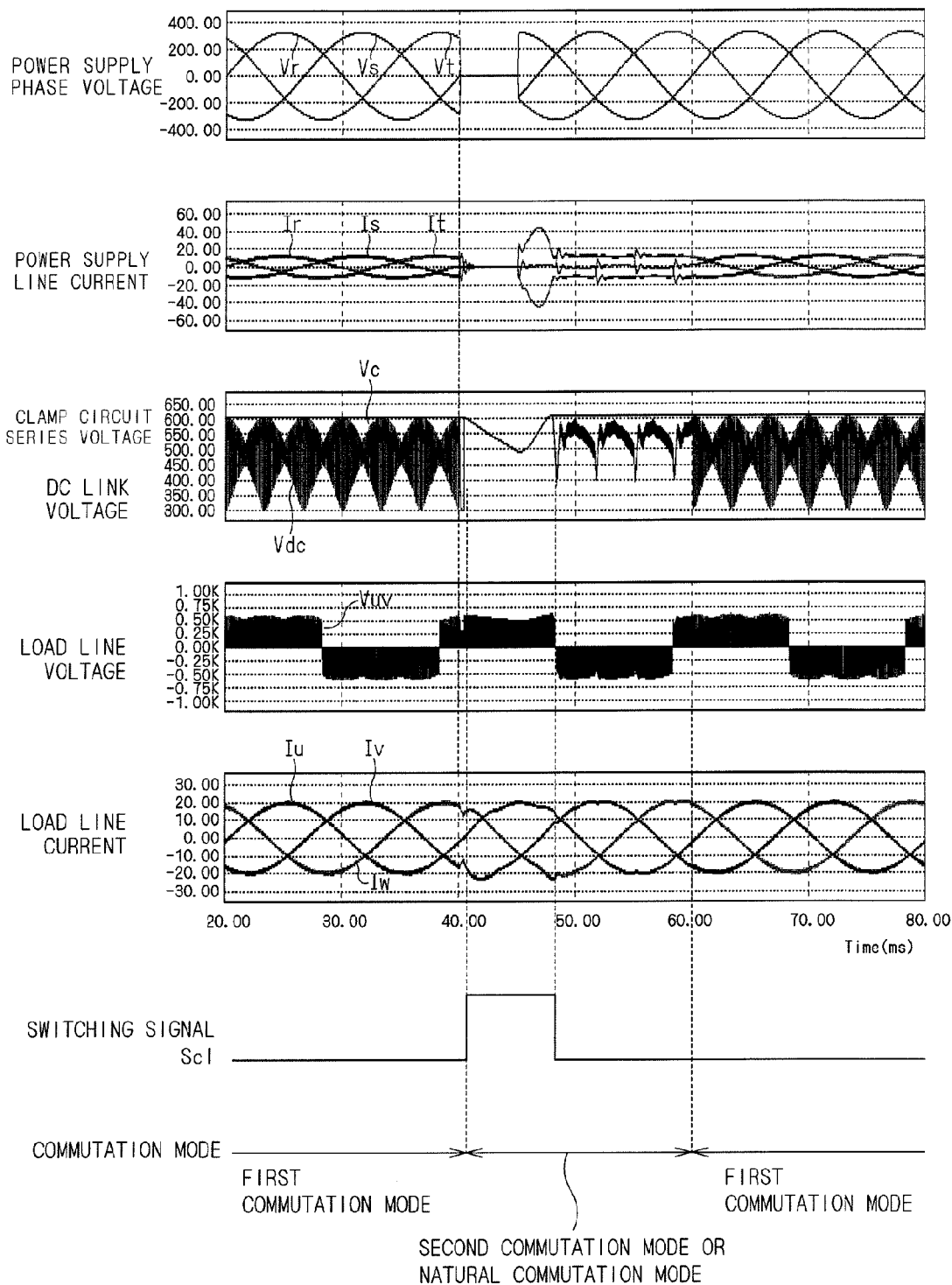
FIG. 34 is a graph showing still another operation of switching the commutation modes of the converter.

FIG. 34 is a graph showing an operation accompanying an instantaneous blackout as well. In this operation, as in the operations shown in FIG. 32 and FIG. 33, the switching signal Sc1 is activated upon the average value Vdc1 of the DC link voltage Vdc falling below the first threshold value (for example, 400 V). The operation shown in FIG. 34 is similar to the operation shown in FIG. 33 in that the switching signal Sc1 is deactivated upon the DC link voltage Vdc exceeding the second threshold value (this is equal to or larger than the first threshold value, for example, 600 V).

Note that in the operation shown in FIG. 34, a delay is provided for a predetermined period of time between deactivation of the switching signal Sc1 and shift to the 120-degree conduction mode. That is, the operations shown in FIG. 31 to FIG. 33 are common in that the first commutation mode is employed at and after the time when the switch section S5 is rendered non-conductive. However, the operation shown in FIG. 34 is different from the operations shown in FIG. 32 and FIG. 33 in that the first commutation mode is employed at and after the time when the switch section S5 is rendered non-conductive and after a lapse of a predetermined period of time. The delay in predetermined period of time as described above is achieved by counting time in the trapezoidal voltage command generating section 11 even when the switching command J sets the first commutation mode.

In the operation shown in FIG. 34, a 120-degree conduction mode is employed in commutation of the converter 4 between deactivation of the switching signal Sc1 and shift to the first commutation mode. In this manner, when the 120-degree conduction mode is employed for commutation of the converter in a case where the clamp circuit functions, though the power supply line currents Ir, Is and It are disturbed considerably, the DC link voltage Vdc is not damaged.

Accordingly, even in a case where the switch section S5 is not provided, a blackout may be detected by detecting the DC link voltage Vdc, and commutation may be performed in the converter by employing a 120-degree conduction mode during the blackout.

Note that the timing at which the switching signal Sc1 is activated may be determined not only using the average value Vdc1 but also using the DC link voltage Vdc itself. As shown in FIG. 31, and as described with reference to FIG. 4, the DC link voltage Vdc changes between envelopes by switching of the converter 4. Therefore, when the first threshold value is set to, for example, 400 V as described above, the DC link voltage Vdc discretely takes values smaller than the first threshold value even during a normal operation.

Therefore, in order to determine the timing at which the switching signal Sc1 is activated merely using the DC link voltage Vdc, it suffices that the sensitivity of the switching command generating section 31 to the DC link voltage Vdc is reduced. Specifically, it suffices that a longer period of time is required for the switching command generating section 31 to recognize the magnitude of the DC link voltage Vdc. For example, the switching command J is generated when the DC link voltage Vdc keeps the first threshold value or smaller value for a predetermined period of time, whereby the switch section S5 is rendered conductive.

Needless to say, comparison between the average value Vdc1 and the first threshold value is advantageous in that the DC link voltage Vdc does not need to be continually measured for a predetermined period of time.

The switching command generating section 31 may be responsible for the function of obtaining the average value Vdc1 from the DC link voltage Vdc. Alternatively, an operation section or an integrator circuit that is separately provided may be responsible for that function, and the average value Vdc1 may be input to the switching command generating section 31.

While the invention has been shown and described in detail, the foregoing description is in all aspects illustrative and not restrictive. It is therefore understood that numerous modifications and variations can be devised without departing from the scope of the invention.

Description of Reference Symbols
  4 current-source converter
  5 clamp circuit
  6 voltage-source inverter
  C1, C2 capacitor
  Dc1 clamp diode
  D12, D13 diode
  LH first DC power supply line
  LL second DC power supply line
  Pr, Ps, Pt input end
  Pu, Pv, Pw output end
  S1 switch
  S5 switch section
  Trp, Tsp, Ttp, Trn, Tsn, Ttn first switching device group
  Tup, Tvp, Twp, Tun, Tvn, Twn second switching device group
  Vr*, Vs*, Vt* trapezoidal wave (phase voltage command)

The invention claimed is:

1. A power converter, comprising:
    a plurality of input ends;
    a first DC power supply line;
    a second DC power supply line applied with a potential lower than that of said first DC power supply line;
    a current-source converter including:
        a plurality of first transistor-based switching devices connected between each of at least two of said plurality of input ends and said first DC power supply line,
        a plurality of second transistor-based switching devices connected between said each of at least two of said plurality of input ends and said second DC power supply line, and
        a plurality of first diodes each connected in series with said plurality of first transistor-based switching device, and a plurality of second diodes each connected in series with said plurality of second transistor-based switching devices, both said plurality of first diodes and said plurality of second diodes having cathodes close to said first DC power supply line;
    a diode provided between said first and second DC power supply lines with an anode thereof directed toward said first DC power supply line;
    a capacitor provided in series with said diode between said first and second DC power supply lines, wherein a potential of said first DC power supply line side of said capacitor is higher than that of said second DC power supply line side of said capacitor;
    a first resistor connected in series with said capacitor and said diode between said first and second DC power supply lines;
    a second resistor provided in a series path linking at least one of said plurality of input ends and said capacitor; and
    a first switch selecting conduction/non-conduction between said at least one of said plurality of input ends and said capacitor via said second resistor,
    wherein said power converter is not provided with another capacitor one end of which is directly connected to said first DC power supply line and the other end of which is directly connected to said second DC power supply line, and
    wherein said first resistor has a resistance value lower than that of said second resistor.

2. The power converter according to claim 1, further comprising:
    a plurality of output ends connected to an inductive load; and a voltage-source inverter including a plurality of switching devices connected between each of said plurality of output ends and said first DC power supply line and a plurality of switching devices connected between each of said plurality of output ends and said second DC power supply line, wherein said first resistor has a resistance value equal to or smaller than a value obtained by dividing a value obtained by subtracting a largest value of a line voltage applied between ones of said plurality of input ends from a rated voltage of said voltage-source inverter by a regenerative current flowing from said inductive load via said voltage-source inverter.

3. The power converter according to claim 1, further comprising:

a plurality of output ends connected to an inductive load;

a voltage-source inverter including a plurality of switching devices connected between each of said plurality of output ends and said first DC power supply line and a plurality of switching devices connected between each of said plurality of output ends and said second DC power supply line; and a second switch connected in parallel with said first resistor.

4. A power converter, comprising:

a plurality of input ends;

a first DC power supply line;

a second DC power supply line applied with a potential lower than that of said first DC power supply line;

a current-source converter including a plurality of switching devices connected between each of at least two of said plurality of input ends and said first DC power supply line and a plurality of switching devices connected between said each of at least two of said plurality of input ends and said second DC power supply line;

a diode provided between said first and second DC power supply lines with an anode thereof directed toward said first DC power supply line;

a capacitor provided in series with said diode between said first and second DC power supply lines;

a first resistor connected in series with said capacitor and said diode between said first and second DC power supply lines;

a plurality of output ends connected to an inductive load;

a voltage-source inverter including a plurality of switching devices connected between each of said plurality of output ends and said first DC power supply line and a plurality of switching devices connected between each of said plurality of output ends and said second DC power supply line; and a bidirectional third switch connected in parallel with said diode and said first resistor.

5. The power converter according to claim 4, wherein said bidirectional third switch includes:

a first transistor connected in anti-parallel with said diode;

a second diode connected in parallel with said first resistor with an anode thereof directed toward said second DC power supply line and a cathode thereof directed toward said first DC power supply line; and a second transistor connected in anti-parallel with said second diode.

6. The power converter according to claim 4, wherein:

said diode and said first resistor are provided on the same side with respect to said capacitor; and said bidirectional third switch includes:

a second diode connected in parallel with said first resistor with an anode thereof directed toward said second DC power supply line and a cathode thereof directed toward said first DC power supply line;

a third diode having an anode connected to the cathode of said second diode;

a fourth diode having an anode connected to a cathode of said diode; and a transistor having a collector connected to a cathode of said third diode and a cathode of said fourth diode and an emitter connected to anodes of said diode and said second diode.

7. The power converter according to claim 4, wherein said bidirectional third switch is rendered conductive before said plurality of switching devices of said voltage-source inverter are all rendered non-conductive.

8. The power converter according to claim 4, wherein:

said plurality of input ends include three input ends, and said plurality of output ends include three output ends;

said current-source converter performs commutation in accordance with any of a first commutation mode and a 120-degree conduction mode determined by results of comparison between a carrier and three trapezoidal waves having a 360-degree cycle and a phase different from each other by 120 degrees;

in said first commutation mode, each of said trapezoidal waves has a pair of flat sections continuous for a 120-degree section and a pair of slope areas linking the pair of flat sections for a 60-degree section;

said current-source converter performs commutation by comparison between said carrier and said trapezoidal waves changing between said pair of flat sections in said first commutation mode;

said 120-degree conduction mode is employed upon rendering said bidirectional third switch conductive in a state in which said first commutation mode is employed; and said first commutation mode is employed at and after the time when said bidirectional third switch is rendered non-conductive.

9. The power converter according to claim 8, wherein said bidirectional third switch is rendered conductive when a power factor of said inductive load connected to said plurality of output ends falls below a predetermined value.

10. The power converter according to claim 9, wherein:

said inductive load is a rotary machine; and said current-source converter performs commutation in accordance with said 120-degree conduction mode during a predetermined period at the beginning of activation.

11. The power converter according to claim 8, wherein said bidirectional third switch is rendered conductive when a DC voltage between said first and second DC power supply lines falls below a first threshold value.

12. The power converter according to claim 11, wherein:

said bidirectional third switch is rendered non-conductive when the DC voltage between said first and second DC power supply lines keeps a value exceeding a second threshold value equal to or larger than said first threshold value for a predetermined period; and said first commutation mode is employed upon rendering said third switch non-conductive.

13. The power converter according to claim 12, wherein said bidirectional third switch is rendered non-conductive upon the DC voltage between said first and second DC power supply lines exceeding the second threshold value equal to or larger than said first threshold value.

14. The power converter according to claim 13, wherein said first commutation mode is employed upon rendering said third switch non-conductive.

15. The power converter according to claim 13, wherein said first commutation mode is employed after a lapse of a predetermined period from non-conduction of said bidirectional third switch.

16. The power converter according to claim 8, wherein:
said 120-degree conduction mode is a second commutation mode;
each of said trapezoidal waves has a pair of flat sections continuous for a 180-degree section in said second commutation mode; and
in said second commutation mode, said current-source converter performs commutation by comparison between said carrier and said trapezoidal waves changing between said pair of flat sections.

17. The power converter according to claim 8, wherein said 120-degree conduction mode is a natural commutation mode in which said plurality of switching devices of said current-source converter are all conductive.

18. A power converter, comprising:
a plurality of input ends;
a first DC power supply line;
a second DC power supply line applied with a potential lower than that of said first DC power supply line;
a current-source converter including a plurality of switching devices connected between each of at least two of said plurality of input ends and said first DC power supply line and a plurality of switching devices connected between said each of at least two of said plurality of input ends and said second DC power supply line;
a diode provided between said first and second DC power supply lines with an anode thereof directed toward said first DC power supply line;
a capacitor provided in series with said diode between said first and second DC power supply lines; and
a first resistor connected in series with said capacitor and said diode between said first and second DC power supply lines,
wherein said diode and said first resistor are provided on said second DC power supply line side with respect to said capacitor, said power converter further comprising:
a second capacitor connected, between said first and second DC power supply lines, in series with the series connection of said diode and said first resistor on a side opposite to said capacitor;
a fifth diode having an anode connected between said series connection and said second capacitor and a cathode connected to said first DC power supply line; and
a sixth diode having an anode connected to said second DC power supply line and a cathode connected between said series connection and said capacitor.

* * * * *